US011673362B2

(12) United States Patent
Webb

(10) Patent No.: US 11,673,362 B2
(45) Date of Patent: Jun. 13, 2023

(54) COMPOSITE STRUCTURAL PANELS AND METHODS OF FORMING THEREOF

(71) Applicant: The Boeing Company, Chicago, IL (US)

(72) Inventor: Sean C. Webb, Charleston, SC (US)

(73) Assignee: The Boeing Company, Chicago, IL (US)

(*) Notice: Subject to any disclaimer, the term of this patent is extended or adjusted under 35 U.S.C. 154(b) by 410 days.

(21) Appl. No.: 16/732,965

(22) Filed: Jan. 2, 2020

(65) Prior Publication Data

US 2021/0206135 A1 Jul. 8, 2021

(51) Int. Cl.
*B32B 3/12* (2006.01)
*B29C 53/56* (2006.01)
(Continued)

(52) U.S. Cl.
CPC ............ *B32B 3/12* (2013.01); *B29C 53/56* (2013.01); *B29C 69/003* (2013.01); *B32B 37/12* (2013.01); *B29C 66/72525* (2013.01); *B29L 2023/00* (2013.01); *B32B 37/146* (2013.01); *B32B 38/0004* (2013.01); *B64C 1/18* (2013.01); *B64D 29/00* (2013.01)

(58) Field of Classification Search
CPC ............ B32B 3/12; B29D 99/0089; Y10T 428/24149; Y10T 428/14165; B29C 69/003; B29C 53/56–585

See application file for complete search history.

(56) References Cited

U.S. PATENT DOCUMENTS

| 4,253,992 A | 3/1981 | Soejima et al. |
| 8,926,786 B1 | 1/2015 | Rapp et al. |

(Continued)

FOREIGN PATENT DOCUMENTS

| EP | 2777907 A1 | 9/2014 | |
| GB | 2242389 A * | 10/1991 | ............. B29C 70/34 |

OTHER PUBLICATIONS

European Application Serial No. 20215233.6, Office action dated Mar. 14, 2022, 5 pages.

(Continued)

*Primary Examiner* — Carson Gross
(74) *Attorney, Agent, or Firm* — Kwan & Olynick LLP

(57) ABSTRACT

Described are novel composite structural panels and methods of forming such panels. In some examples, a method comprises wrapping a mandrel with a composite tape to form a composite tube. This wrapping operation allows forming composite tubular structures with any cross-sectional profiles defined by the mandrel. The wrapping is also used to control the fiber orientations in the composite tubular structures. The composite tube is then cut into composite tubular structures. In some examples, the composite tube is partially cured prior to the cutting, which allows removal of the mandrel while preserving the shape of the composite tube. This cutting operation allows forming composite tubular structures with different lengths, shapes, and orientations of the ends. The composite tubular structures are disposed on a support structure and are bonded to each other. In some examples, this bonding operation also involves final curing of the composite tubular structures.

20 Claims, 23 Drawing Sheets

(51) Int. Cl.
*B29C 69/00* (2006.01)
*B32B 37/12* (2006.01)
*B29L 23/00* (2006.01)
*B64C 1/18* (2006.01)
*B64D 29/00* (2006.01)
*B29C 65/00* (2006.01)
*B32B 37/14* (2006.01)
*B32B 38/00* (2006.01)

(56) References Cited

U.S. PATENT DOCUMENTS

| | | | |
|---|---|---|---|
| 9,120,255 B2 * | 9/2015 | Oldroyd | B29C 53/828 |
| 2006/0188906 A1 | 8/2006 | Kim et al. | |
| 2013/0224410 A1 * | 8/2013 | Nozawa | B29C 70/342 |
| | | | 428/117 |
| 2016/0375668 A1 * | 12/2016 | Bremmer | B29C 61/00 |
| | | | 156/60 |
| 2018/0169882 A1 * | 6/2018 | Kendrick | B29C 70/545 |
| 2019/0195259 A1 | 6/2019 | Banihashemi et al. | |
| 2019/0224939 A1 | 7/2019 | Kooiman et al. | |
| 2019/0299542 A1 | 10/2019 | Webb | |

OTHER PUBLICATIONS

European Application Serial No. 20215233.6, Search Report dated May 25, 2021, 7 pgs.

* cited by examiner

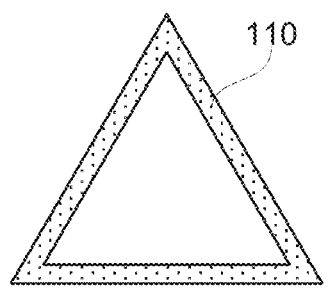
*FIG. 4A*
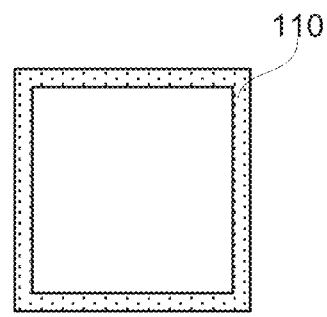
*FIG. 4B*
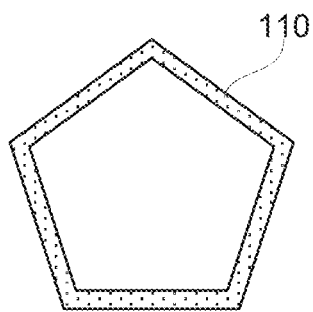
*FIG. 4C*
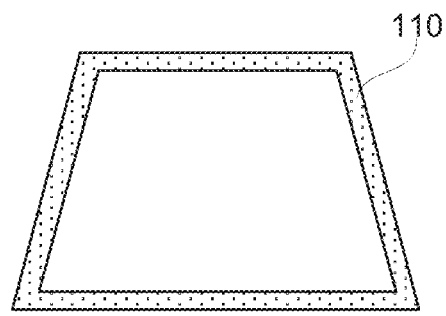
*FIG. 4D*
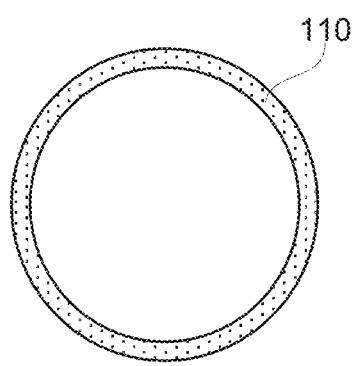
*FIG. 4E*
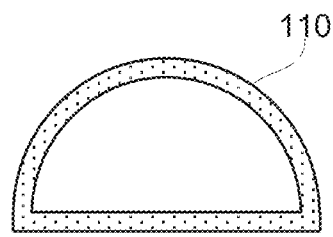
*FIG. 4F*
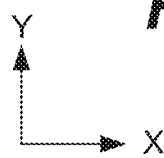

COMPOSITE STRUCTURAL PANELS AND METHODS OF FORMING THEREOF

BACKGROUND

Honeycomb-based structural panels are used for many applications because of their low weight and high strength. One example of such panels is a sandwich panel, in which a honeycomb core is disposed between and adhered to face sheets. A honeycomb core is typically formed using expansion or corrugation. The expansion method involves cutting flat sheets and applying very specific adhesive patterns to these sheets. The sheets are then stacked to form adhesive bonds. Finally, the stack is expanded to form a honeycomb core. The corrugation method involves pressing metallic sheets between toothed rollers, thereby forming corrugated sheets. The process continues with bonding, brazing, or welding these corrugated sheets to form a honeycomb core. Both methods impose major limitations to materials, honeycomb cell shapes, and overall design of structural panels. Furthermore, forming non-planar structural panels is challenging using these conventional techniques.

What is needed are novel composite structural panels and methods of forming these panels, while addressing various challenges and limitations listed above.

SUMMARY

Described are novel composite structural panels and methods of forming such panels. In some examples, a method comprises wrapping a mandrel with a composite tape to form a composite tube. This wrapping operation allows forming composite tubular structures with any cross-sectional profiles defined by the mandrel. The wrapping is also used to control the fiber orientations in the composite tubular structures. The composite tube is then cut into a plurality of composite tubular structures. In some examples, the composite tube is partially cured prior to the cutting, which allows removal of the mandrel while preserving the shape of the composite tube. This cutting operation allows forming composite tubular structures with different lengths, different shapes, and orientations of the ends. The composite tubular structures are disposed on a support structure and are bonded to each other. In some examples, this bonding operation also involves final curing of the composite tubular structures.

In some examples, a method comprises wrapping a mandrel with a composite tape to form a composite tube, cutting the composite tube to form composite tubular structures, arranging the composite tubular structures on a support structure, and bonding the composite tubular structures together by co-curing, co-bonding, or secondary bonding.

In some examples, a composite structural panel comprises composite tubular structures, directly contacting and bonded to each other, thereby forming an interconnected grid. The interconnected grid comprises a first grid surface and a second grid surface, opposite of the first grid surface. Each of the composite tubular structures comprises a first end and a second end, opposite of the first end. The first end of each of the composite tubular structures forms a part of the first grid surface. The second end each of the composite tubular structures forms a part of the second grid surface. Each of the composite tubular structures comprises a composite wall, extending between the first end and the second end and forming a perimeterically enclosed space. The composite wall is monolithically joined with one or more composite walls of adjacent ones of the composite tubular structures. The composite structural panel further comprises a first composite face sheet, disposed over and directly contacting each of composite tubular structures at the first end. The first composite face sheet seals the perimeterically enclosed space of each of the composite tubular structures at the first end.

BRIEF DESCRIPTION OF THE DRAWINGS

FIG. 4A-FIG. 4F are schematic top views of different examples of a composite tubular structure.

DETAILED DESCRIPTION

Figure 1:
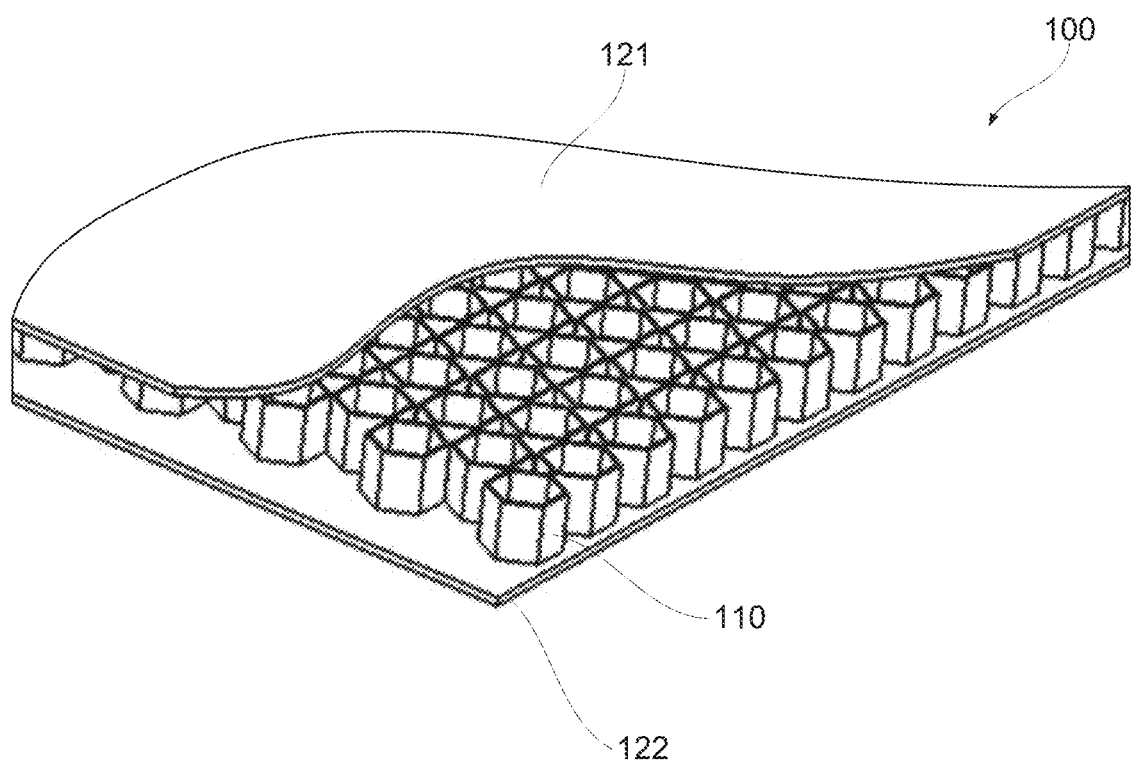
FIG. 1 is a schematic view of a composite structural panel, comprising composite tubular structures, bonded together and disposed between two composite face sheets, in accordance with some examples.

In the following description, numerous specific details are set forth in order to provide a thorough understanding of the presented concepts. In some examples, the presented concepts are practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Introduction

Honeycomb-based structural panels have been limited to specific materials and designs in the past, due to various limitations in conventional fabrications techniques. Methods of fabricating composite structural panels described herein overcome these limitations and provide various options for many new designs of the composite structural panels, which have not been previously available. In particular, these methods involve mandrel wrapping to form composite tubes, tube cutting to form composite tubular structures, and arranging these tubular structures to produce various new designs and characteristics of composite structural panels. For example, wrapping a mandrel with a composite tape provides controlled orientations of fibers in composite tubular structures. These composite tubular structures can be arranged in multiple different ways to achieve different levels of contact and bonding between the structures. Different arrangements result in different panel densities, which are defined as a number of composite tubular structures per unit area of a panel. Furthermore, different arrangements result in different properties, such as mechanical strength, weight, and the like. In some examples, different types of composite tubular structures (e.g., structures with different cross-sectional profiles and/or different materials) are used in the same composite structural panel. Specific types of composite tubular structures (e.g., with tapered side walls) are used to form composite structural panels with non-planar surfaces or, more specifically, curved surfaces, while maintaining desired contact levels between the composite tubular structures. For examples, curved composite structural panels are used as nacelles, fuselage components, radomes, wing structures (e.g., leading edges of wings). These are just a few examples of new features in composite structural panels provided by the novel methods.

In some examples, a method starts with wrapping a mandrel with a composite tape to form a composite tube. At this stage, the composite tape is still in their green state. The application is performed, for example, using an automated fiber placement or automated tape laying technique. In some examples, a unidirectional tape or a braided composite fabric weave is used as a composite tape for mandrel wrapping. The fiber direction in the resulting composite tube and, eventually, in composite tubular structures is controlled through during application of these composite tape onto the mandrel, e.g., by controlling the orientation of the composite tape relative to the mandrel. In some examples, specific fiber orientations are selected to enhance the out-of-plane shear and/or compressive strength capability of the resulting composite structural panel, while also reducing the weight. For example, enhanced compressive strength of the composite structural panel is used to fine tune crushing and energy absorption characteristics for simulated operating scenarios. In another example, a composite structural panel is used under a passenger deck cargo floor to minimize dents from low-velocity impact of throwing luggage onto the cargo floor.

The cross-sectional shape of the mandrel defines the cross-sectional shape of the composite tube (wrapped over the mandrel) and, eventually, composite tubular structures (formed by cutting the composite tube). In general, any cross-sectional shape of composite tubular structures is possible. The cross-sectional shape of these structures is one of the factors that control properties of a resulting composite structural panel. Furthermore, in some examples, the mandrel has a variable cross-section along the length, e.g., to fabricate composite tubular structures with different cross-sections on the same mandrel.

In some examples, the wall thickness of composite tubular structures is controlled using a different number of composite tape layers, stacked on the top of each other. Also, different types of composite tapes can be used to fabricate the same composite tubular structure. In some examples, the wall thickness of the same composite tubular structure is varied, e.g., around the perimeter, along the length of the composite tubular structure, or both. For example, more layers of composite tapes are positioned on one side of a mandrel. Overall, the described method of forming composite structural panels allows forming composite tubular structures with any wall thicknesses and tailor these wall thicknesses for specific needs and applications. It should be noted that conventional methods are generally limited to thin walled structures due to the nature of forming honeycomb cells, i.e., relying on plastically deforming thin sheets of aluminum to maintain shape. Thicker metal sheets will not plastically deform as easily. Much higher forces are required, while adhesives (used to bond these sheets) are not strong enough to support these higher forces.

In some examples, a composite tube, formed on the mandrel, is partially cured. This partial curing is performed while the composite tube is still disposed on the mandrel. The mandrel helps to preserve the cross-section of the composite tube and, in some examples, can be used to assist with curing, e.g., to conduct the heat to the inner surface of the composite tube, to support the composite tube while the pressure is applied to the external surface of the composite tube, and the like.

The method proceeds with cutting the composite tube into composite tubular structures. In some examples, the composite tube is removed from the mandrel prior to this cutting operation. The cutting operation controls the length of each composite tubular structure. Also, the cutting operation controls the shape and the orientation of each end of the composite tubular structure, e.g., if these ends are parallel to each other or positioned at some angle greater than 0° relative to each other (and therefore are not parallel). In some examples, these controls are used for form non-planar composite structural panels, e.g., curved panels, panels with variable thickness, and the like.

The composite tubular structures are then arranged on a support structure, which, in some examples, is one of the face sheets. Alternatively, a temporary support structure is used. It should be noted that while being arranged, the composite tubular structures are not fully cured. In some examples, the composite tubular structures comprise a remaining uncured adhesive, which is later used to bond these composite tubular structures together and, in some examples, to one or more face sheets.

Various arrangements of composite tubular structures are possible, e.g., to achieve different levels of contact between the structures, different densities, and the like. In some examples, the composite tubular structures, used for the same panel, have the same or different cross-sections. In some examples, once arranged, the composite tubular structures are covered by an additional face sheet, such that the composite tubular structures are disposed between two face sheets.

The arranged composite tubular structures are then cured together. This curing operation bonds the composite tubular structures together and, in some examples, to one or two face sheets, directly interfacing these composite tubular structures. More specifically, this curing operation forms a monolithic grid from the composite tubular structures. This operation may be referred to as co-curing, since multiple composite tubular structures are simultaneously cured, together and in contact with each other and, in some examples, together and in contact with one or two face sheets.

FIG. 1 is a schematic illustration of composite structural panel 100, in accordance with some examples. Composite structural panel 100 comprises composite tubular structures 110, arranged in accordance with a specific pattern and bonded together, thereby forming a monolithic grid, Other possible arrangements of composite tubular structures 110 and designs of composite tubular structures 110 are described below. In the example shown in FIG. 1, composite structural panel 100 also comprises first composite face sheet 121 and second composite face sheet 122. Composite tubular structures 110 are disposed between first composite face sheet 121 and second composite face sheet 122. More specifically, composite tubular structures 110 are bonded to each of first composite face sheet 121 and second composite face sheet 122. One having ordinary skill in the art would understand that a portion of first composite face sheet 121 is not shown in FIG. 1 to illustrate composite tubular structures 110 positioned under that portion. Composite structural panel 100, shown in FIG. 1, can be used for various aircraft applications, such as floor supports and the like.

Method Examples

Figure 2:
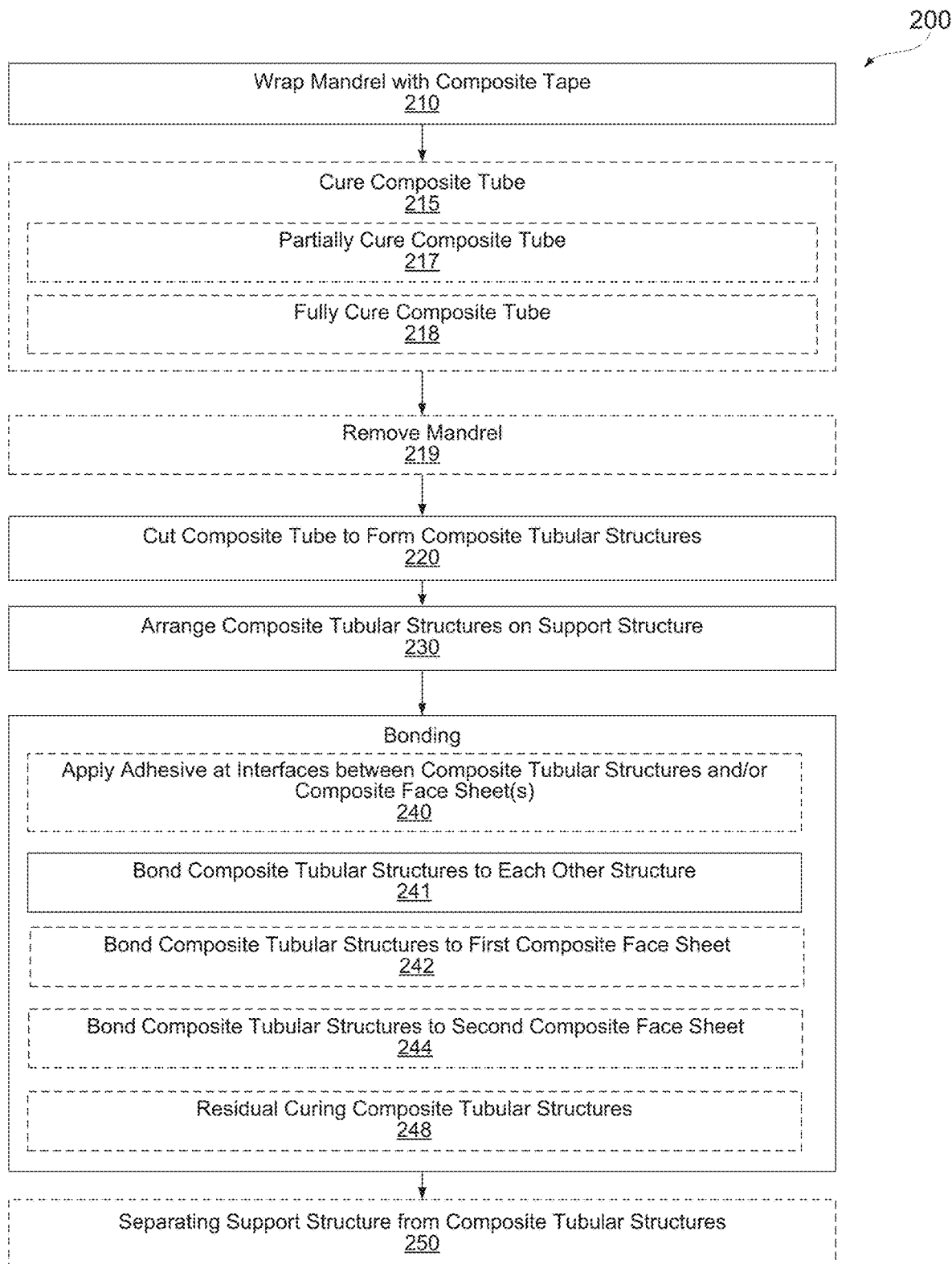
FIG. 2 is a process flowchart corresponding to a method of fabricating a composite structural panel, in accordance with some examples.

FIG. 2 is a process flowchart corresponding to method 200 for fabricating composite structural panel 100, in accordance with some embodiments. As noted above, method 200 differs from conventional expansion and corrugation methods and allows for new designs and improved characteristics of composite structural panel 100. Various examples of composite structural panel 100 are described below with reference to operations of method 200 and, separately, with reference to FIG. 8A-FIG. 8F and FIG. 9A FIG. 9B.

Method 200 comprises wrapping mandrel 300 with a composite tape 310 (block 210 in FIG. 2) to form composite tube 315. Various examples of composite tape 310 are within the scope. In some examples, composite tape 310 comprises a matrix material and a reinforcement material, disposed within the matrix material. Examples of suitable reinforcement materials include, but are not limited to, fibrous members (e.g., fibers, strands, and braids), woven or nonwoven mats (e.g., fiberglass), metals, minerals, conductive or nonconductive graphite or carbon, nylon, aramids, and the like. In specific examples, composite tape 310 comprises unidirectional fibers or, more specifically, unidirectional carbon fibers. Examples of suitable reinforcement materials include, but are not limited to, thermoplastic or thermoset polymeric resins. Sone examples of thermosetting resins include allyls, alkyd polyesters, bismaleimides (BMI), epoxies, phenolic resins, polyesters, polyurethanes (PUR), poly-urea-formaldehyde, cyanate ester, and vinyl ester resin. Some examples of thermoplastic resins include liquid-crystal polymers (LCP); fiuoroplastics, including polytetrafiuoroethylene (PTFE), fluorinated ethylene propylene (FEP), perfiuoroalkoxy resin (PFA), polychlorotrifiuoroethylene (PCTFE), and polytetrafiuoroethylene perfiuoromethylvinylether (MFA); ketone-based resins, including polyetheretherketone (PEEKTM®, a trademark of Victrex PLC Corporation, Thointons Cleveleys Lancashire, UK); polyamides such as nylon-6/6, 30% glass fiber; poly ethersulfones (PES); polyamideimides (PAIS), polyethylenes (PE); polyester therrnoplastics, including polybutylene terephthalate (PBT), polyethylene terephthalate (PET), and poly (phenylene terephthalates); polysulfones (PSU); poly(phenylene sulfides) (PPS).

Mandrel 300 defines the interior cross-section of composite tube 315 formed during the wrapping operation. Specifically, composite tube 315 conforms to mandrel 300. Therefore, the internal profile of composite tube 315 is substantially the same as the external profile of mandrel 300. Furthermore, when the wall thickness of composite tube 315 is substantially even, mandrel 300 also defined the external profile of composite tube 315.

Figure 3A:
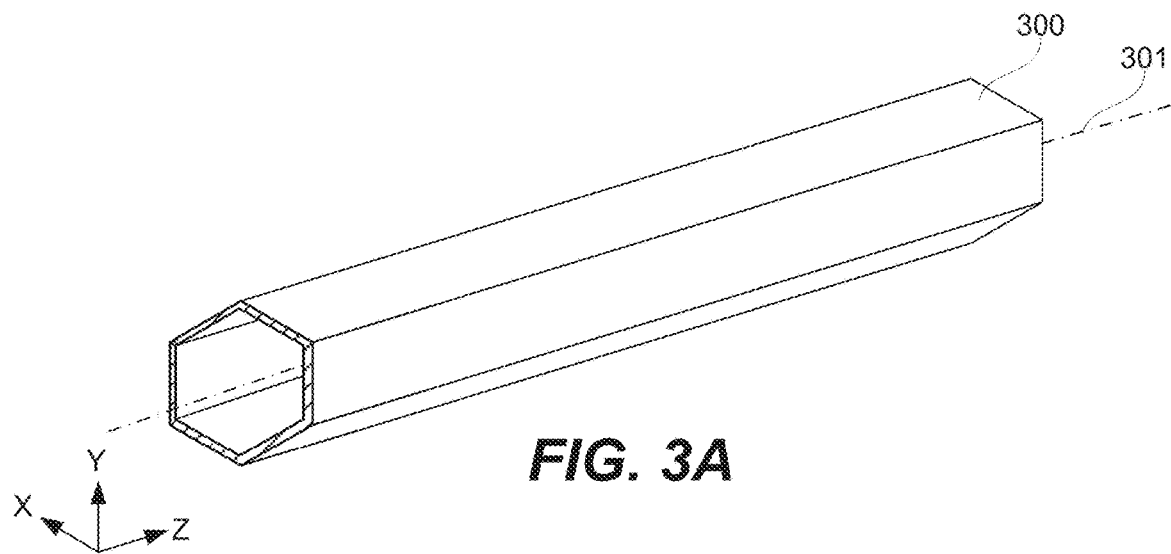
FIG. 3A is a schematic perspective view of a mandrel, used during the fabrication of a composite structural panel.
Figure 3B:
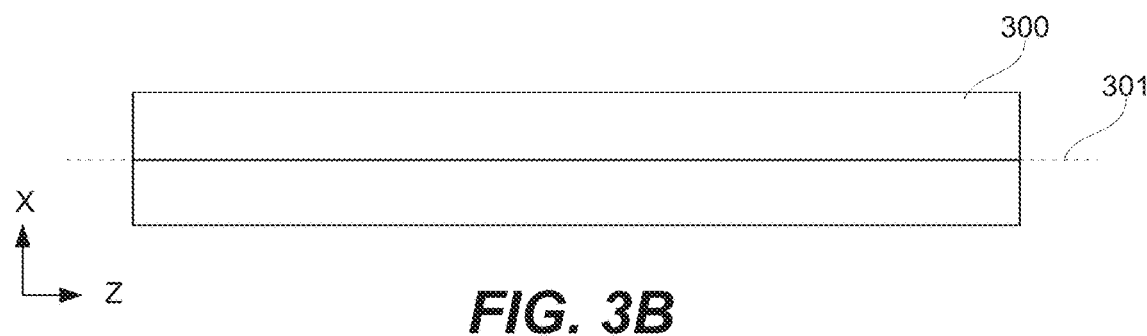
FIG. 3B is a schematic top view of the mandrel in FIG. 3A.
Figure 3C:
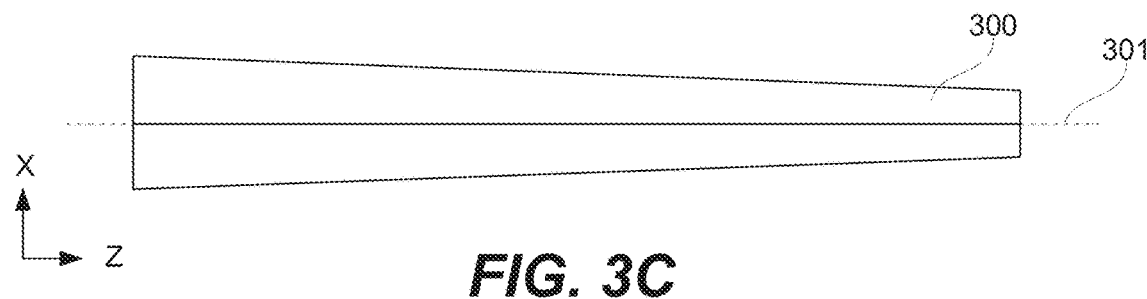
FIG. 3C is a schematic top view of another mandrel, having a tapered shape, in accordance with some examples.

FIG. 3A-FIG. 3C illustrate two examples of mandrel 300. In both examples, mandrel 300 has a hexagonal cross-section. For purposes of this disclosure, all cross-sections are defined in the direction perpendicular to centers axes (e.g., center axis 301 of mandrel 300)/perpendicular to the length of an object. FIG. 3A and FIG. 3B illustrates an example, in which the cross-section of mandrel 300 is constant along the length of mandrel 300. FIG. 3C illustrates another example of mandrel 300 with a variable cross-section. In this example, the cross-section is larger at one end of mandrel 300 (in the left) than at other end (in the right). For example, mandrel 300 illustrates in FIG. 3C is used to form composite tubular structures 110 with tapered composite walls 113 as further described below with reference to FIG. 6A and FIG. 6B.

While FIG. 3A-FIG. 3C illustrate the hexagonal cross-sectional of mandrel 300, other cross-sectional profiles are also within the scope. Some of these examples are described below with reference to FIG. 4A-FIG. 4F, illustrating cross-sectional profiles of composite tubular structures 110 formed using various types of mandrel 300. Furthermore, in some examples, the same mandrel has different cross-sectional shapes along the length (e.g., hexagonal on one end and triangular on the other end) to fabricate composite tubular structures 110 with different cross-sections. Finally, in some examples, multiple different mandrels are used in the wrapping operations to fabricate composite tubular structures 110 with different cross-sections.

Figure 3D:
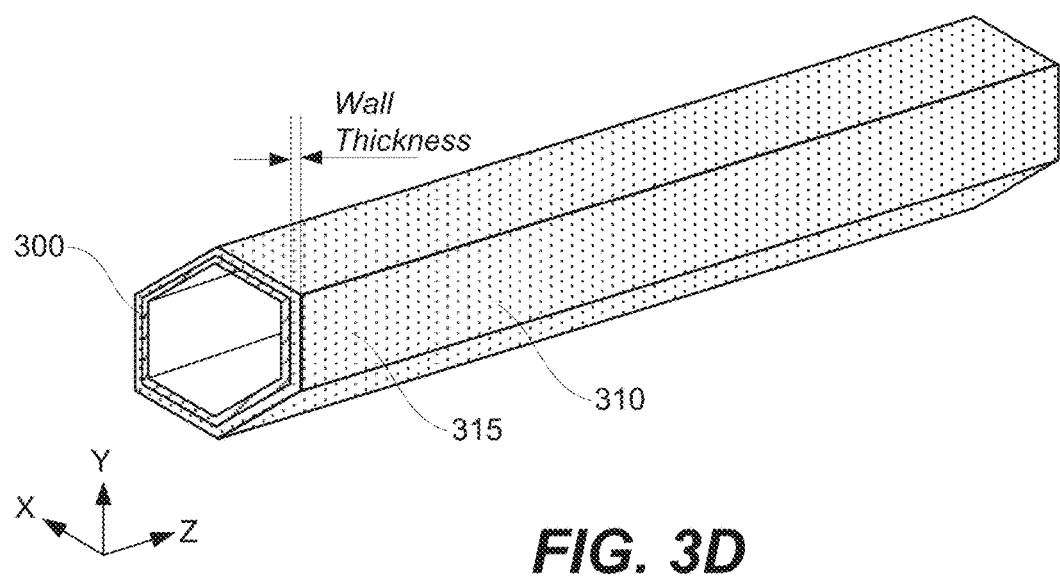
FIG. 3D is a schematic illustration of a composite tube, disposed over a mandrel, during fabrication of a composite structural panel, in accordance with some examples.
Figure 3E:
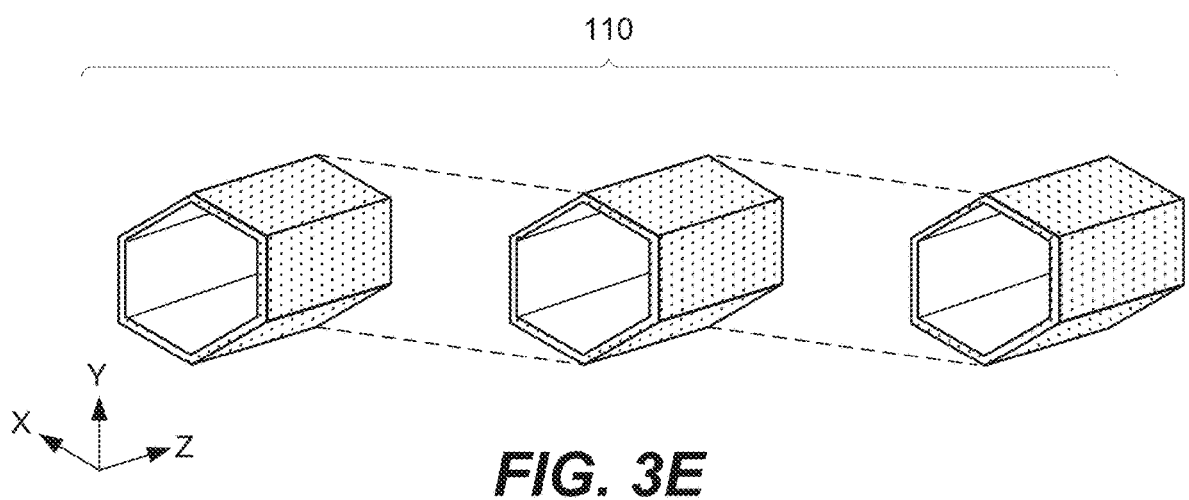
FIG. 3E is a schematic illustration of composite tubular structures formed by cutting a composite tube, in accordance with some examples.
Figure 3F:
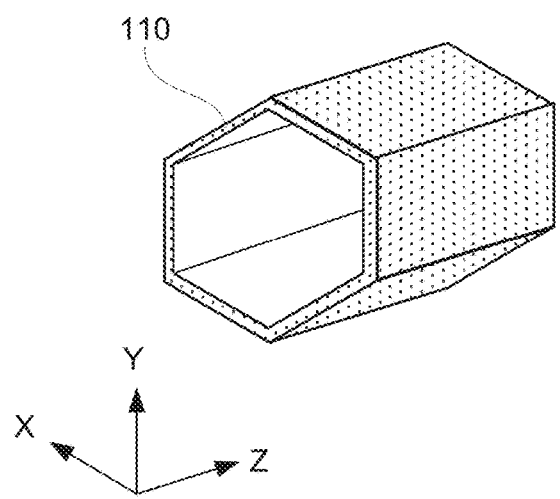
FIG. 3F is a schematic perspective view of a composite tubular structure, in accordance with some examples.

In some examples, the wrapping is performed along and/or about different axes, e.g., identified as X-Y-Z in FIG. 3D. The wrapping direction depends on the type of composite tape 310 (e.g., fiber orientations in composite tape 310) and desired properties of composite tubular structures 110, which are later formed from composite tube 315. In some examples, composite tape 310 is wrapped around center axis 301 of mandrel 300, In other examples, composite tape 310 is wrapped along center axis 301 and/or at various angles relative to center axis 301, Furthermore, in some examples, different layers of composite tape 310 are positioned at different angles.

In some examples, composite tape 310 is wrapped using various automated fiber placement (AFP) or automated tape laying (ATL) techniques. For example, composite tape 310 is fed by spools of tape prepreg composites, which are carried on one or more end effectors and supplied to compaction rollers. The rollers apply and compress composite tape 310 onto mandrel 300.

In some examples, composite tape 310 is heated and compressed during the mandrel wrapping operation. Furthermore, in some examples, mandrel 300 is heated to ensure the conformal wrapping. It should be noted that composite tape 310 is not cured during this wrapping operation.

FIG. 3D illustrates composite tube 315 disposed over mandrel 300, e.g., after completing the mandrel wrapping operation. Composite tube 315 conforms to the external surface of mandrel 300. In some examples, composite tube 315 is longer than each of composite tubular structures 110. As such, one composite tube 315 can be used to form multiple composite tubular structures 110.

Furthermore, this wrapping operation also defines the wall thickness of composite tube 315 and, as a result, the wall thickness of composite tubular structures 110. Specifically, the thickness of each layer of composite tape 310 and the number of the layers, stacked on the top of each other, define the wall thickness. In some examples, the wall thickness is uniform around the perimeter of composite tube 315 and/or along the length of composite tube 315. Alternatively, the wall thickness varies around the perimeter of composite tube 315 and/or along the length of composite tube 315. Unlike with conventional methods described above, there are no constraints to the maximum wall thickness of composite tubular structures 110. Furthermore, in some examples, composite tubular structures 110 with different wall thicknesses are arranged into the same grid.

In some examples, method 200 further comprises curing composite tube 315 (block 215 in FIG. 2). Composite tube 315 proceeds either through partial curing (block 217) or full curing (block 218). In the partial curing example, composite tubular structures 110, which are formed from composite tube 315, undergo residual curing (block 248), which is further described below. Specifically, composite tube 315, which is partially cured, is cut into composite tubular structures 110 that are arranged into a grid and residually cured together in this grid. Furthermore, in the partial curing example, uncured adhesive, remaining in composite tubular structures 110 prior to the residual curing, can be used for bonding composite tubular structures 110, while being residually cured in the grid.

In some examples, composite tube 315 is partially cured (block 217) to achieve between 50% and 90% of the mechanical properties of the fully cured state or, more specifically, between 60% and 80% of the mechanical properties of the fully cured state. For most composite materials, mechanical properties increase as these composite materials continue curing and reach their maximum at the fully cured state. For purposes of this disclosure, partial curing is defined as a curing process, which yields a structure having mechanical properties hardness, tensile strength) that are less than 100% of the fully cured state. In some examples, a partially cured structure has a remaining adhesive that is not fully cross-linked and is able to adhere to other surrounding structures.

Partial curing can be also understood in the context of the overall prepreg processing, which will be now described. The initial stage (A stage) comprises mixing resin components, such as a base and a hardener. The initial mixing triggers various chemical reactions between these components, but the extent of these reactions is minimal at this mixing stage. The second stage (B stage) corresponds to progression of the chemical reactions between the resin components. Specifically, the resin mixture thickens and becomes tacky and is partially cured. Prepreg components (e.g., composite tape), comprising resin mixtures, are in this second stage (B stage) and may be referred to as partially cured prepreg components, To prevent further curing of the resin mixtures in these prepreg components, the temperature of the prepreg components is lowed (e.g., to −15° C. or even to −20° C.), e.g., by placing these prepreg components into a freezer. In the frozen state, the resin mixture of a prepreg component stays in this partially cured state (B stage). The curing continues when the prepreg component is removed from the freezer and warmed up (e.g., to a room temperature). In the next stage (C stage), the resin of a prepreg component is fully cured. It should be noted that some resins cure at the room temperature, while other need elevated temperatures to fully cure.

As such, in a partially cured state (B stage), the resin of a prepreg component has undergone some cross-polymerization. Further polymerization is prevented by reducing the temperature of the prepreg. The level of polymerization, which may be also referred to as a level of curing, is evident from the mechanical properties of the prepreg component. In some examples, the mechanical properties are close to linearly dependent on the level of polymerization.

In specific examples, a full cure (to C stage) of a composite structure involves 120° C. for 4 hours at a pressure of 1 atmosphere. Partial curing (to B stage) involves 90° C. for 2 hours at a pressure of 1 atmosphere. Similarly, a full cure (to C stage) of another composite structure (e.g., comprising a different resin) involves 175° C. for 8 hours at a pressure of 1 atmosphere. Partial curing (to B stage) of this other structure involves 150° C. for 4 hours at a pressure of 1 atmosphere. In other words, both the curing temperature and the curing duration are reduced for a partial cure, in comparison to the full cure. Once a structure is partially cured (to B stage), the structure is cooled to prevent further curing. The process continues with various operations described above, e.g., arranging the structure into a grid with other structure and co-curing these structures together.

In some examples, curing of composite tube 315 comprises heating composite tube 315. Furthermore, in some examples, composite tube 315 is pressed against mandrel during this curing operation (e.g., to reduce air gaps).

In some examples, this partially curing operation is performed prior to cutting composite tube 315 (block 220—described below). In other words, composite tube 315 is already in the partially cured state while cutting composite tube 315 is cut into composite tubular structures 110. This order of operations allows composite tube 315 to maintain the shape (without mandrel 300) when cutting into composite tubular structures 110. Furthermore, this order of operations also allows to remove composite tube 315 from mandrel 300, e.g., prior to cutting composite tube 315 into composite tubular structures 110. In the partially cured state, composite tube 315 sufficiently maintains the shape even without mandrel 300. It should be noted that, in some examples, composite tubular structures 110 are further cured (e.g., to a fully cured state) after arranging composite tubular structures 110, as further described below. At the same time, the partial curing of composite tube 315, rather than full curing, allows bonding of composite tubular structures 110, formed from composite tube 315, during later operations.

In some examples, method 200 further comprises removing mandrel 300 from composite tube 315 (block 219 in FIG. 2). For example, mandrel 300 is slid from the inside of composite tube 315. In some examples, the difference in coefficients of thermal expansions (CTEs) of mandrel 300 and composite tube 315 is used to assist with this removal operation. Specifically, the curing of composite tube 315 is performed at an elevated temperature, which 2.5 causes mandrel 300 to expand. Composite tube 315 is partially cured in this expanded state of mandrel 300. Subsequent cooling of composite tube 315 and mandrel 300 results in greater contraction of mandrel 300 than composite tube 315, effectively creating a gap between the two. This gap enables the removal of mandrel 300, In some examples, mandrel 300 has a surface coating or is sprayed with an agent to assist with removal of mandrel 300 from composite tube 315.

In some examples, mandrel 300 is removed after curing composite tube 315 (block 215—described above). The curing helps composite tube 315 to maintain the share after removal of mandrel 300. Furthermore, in some examples, mandrel 300 is used for curing, e.g., to deliver heat to the interior of composite tube 315.

In some examples, mandrel 300 is removed prior to cutting composite tube 315 (block 220—described below). As noted above, once composite tube 315 is partially cured, mandrel 300 is no longer necessary to maintain the shape of composite tube 315. Mandrel 300 is removed prior to cutting, e.g., to avoid damage to mandrel 300. Furthermore, removal of composite tube 315 from mandrel 300, as a single component, is simpler than removal of multiple individual composite tubular structures 110 from mandrel 300. Mandrel 300 is supported by other means during the cutting operation.

Alternatively, composite tube 315 remains on mandrel 300 during the cutting operation. For example, mandrel 300 has slits on the surface corresponding to cut locations and allowing for a cutting tool to go below the main surface of mandrel 300. In this example, mandrel 300 provides support to composite tube 315 and later to individual composite tubular structures 110, even during the cutting operation. This cutting-with-mandrel example is used when, e.g., composite tube 315 is sufficiently strong to maintain the shape after the partial curing or after the full curing.

Method 200 comprises cutting composite tube 315 (block 220 in FIG. 2). This cutting operation forms composite tubular structures 110. Examples of composite tubular structures 110 formed by cutting composite tube 315 are shown in FIGS. 3E-3H and FIG. 4A-FIG. 4F.

The cutting operation defines the length and the edge shape of each one of composite tubular structures 110. In some examples, at least two of composite tubular structures 110 have the same length as, for example, show in FIG. 3E and FIG. 5B. The length of composite tubular structures 110 extends along the Z-axis. In these examples, composite structural panel 100 formed from composite tubular structures 110 has a uniform thickness.

Figure 6A:
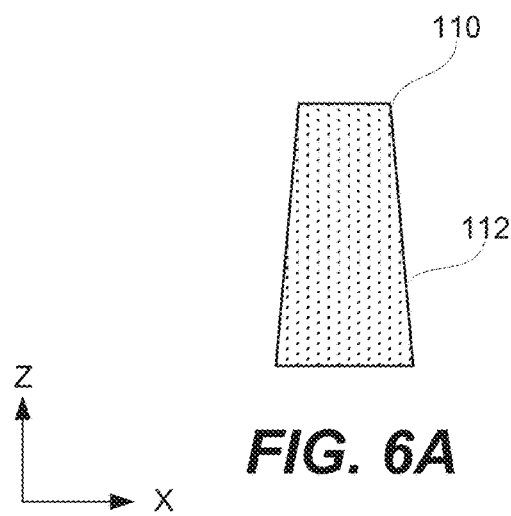
FIG. 6A is a schematic side view of a composite tubular structure with tapered composite walls, in accordance with some examples.
Figure 6B:
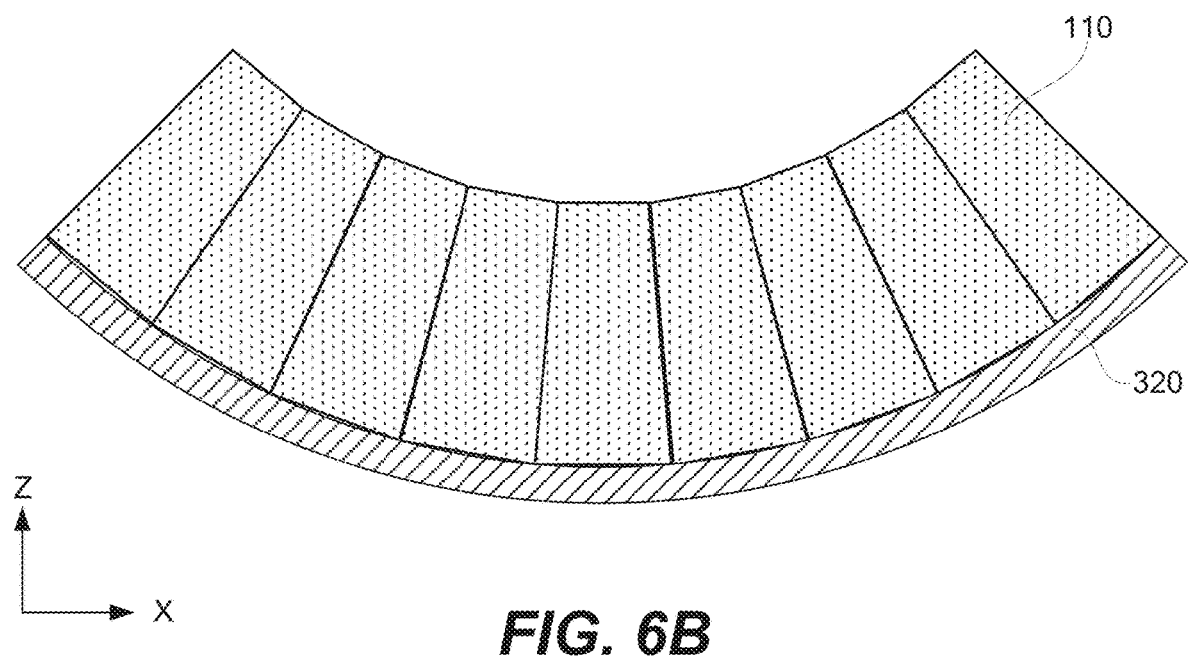
FIG. 6B is a schematic side view of tapered composite tubular structures arranged on a non-planar (e.g., curved) support structure, in accordance with some examples.
Figure 6C:
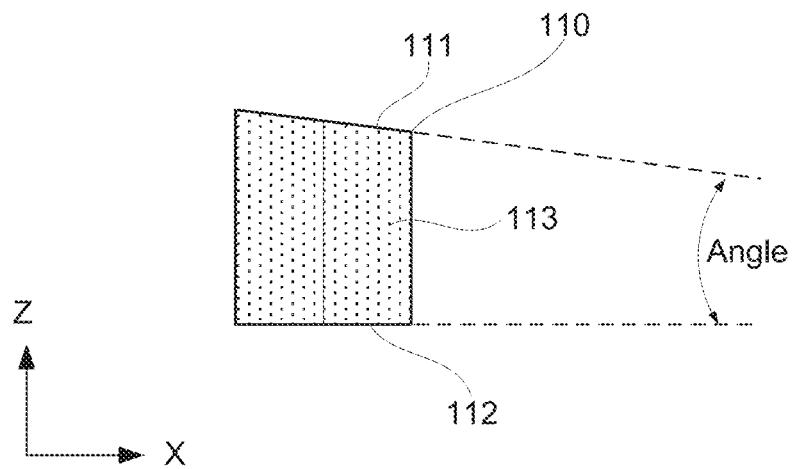
FIG. 6C is a schematic side view of a composite tubular having non-parallel ends, in accordance with some examples.
Figure 6D:
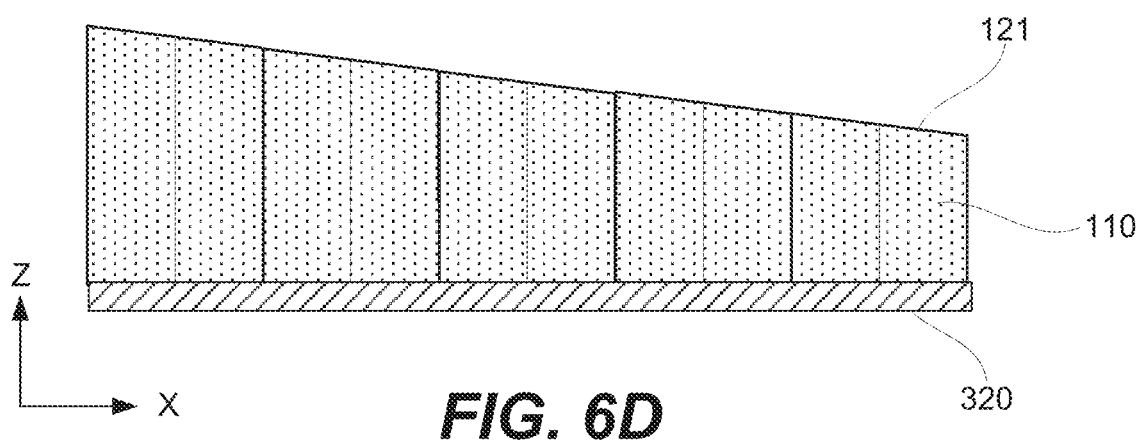
FIG. 6D is a schematic side view of an arrangement formed by composite tubular structures having non-parallel ends, in accordance with some examples.

Alternatively, at least two of composite tubular structures 110, cut from the same composite tube 315, have different lengths as, for example, is schematically shown in FIG. 6D. Specifically, a structure on the left in FIG. 6D is longer than the structure on the right. This variable-length type of composite tubular structures 110 are used, for example, to form composite structural panel 100 with a variable thickness. It should be noted that, in some examples, each of composite tubular structures 110 is cut individually. Therefore, composite tubular structures 110 having different lengths can be cut from the same composite tube.

In some examples, the ends of composite tubular structures 110, cut from composite tube 315, are not parallel to each other. FIG. 6C illustrates an example of such composite tubular structure, comprising first end 111 and second end 112, such that of first end 111 is not parallel to second end 112. More specifically, the angle between first end 111 and second end 112 is greater than 0°. In some examples, such composite tubular structures 110 are used to form a grid with a non-uniform thickness as, e.g., is shown in FIG. 6D.

In some examples, at least one of composite tubular structures 110, cut from composite tube 315, have tapered walls as, for example, is shown in FIG. 6A. It should be noted that this tapered shape of composite tubular structures 110 is defined by mandrel 300, e.g., shown in FIG. 3C. The tapered composite tubular structures are used, e.g., to form non-planar grids, one example of which is shown in FIG. 6B and further discussed below. More specifically, tapered composite tubular structures can be arranged into non-planar grids while maintaining the direct contacts between composite walls of adjacent tubular structures.

Figure 3G:
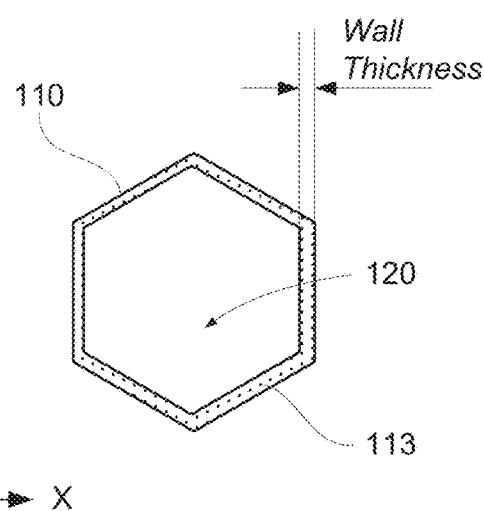
FIG. 3G is a schematic top view of a composite tubular structure, in accordance with some examples.
Figure 3H:
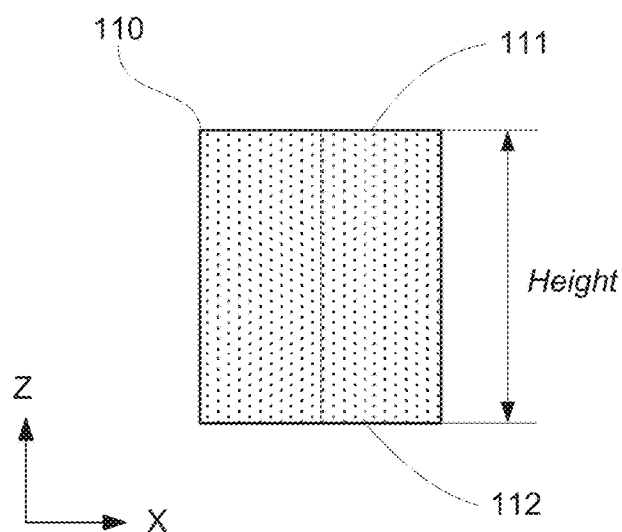
FIG. 3H is a schematic side view of a composite tubular structure, in accordance with some examples.

Referring to FIG. 3G, the wall thickness of composite tubular structures 110 is determined by the wall thickness of composite tube 315, which is described above. However, referring to FIG. 3H, the height of each composite tubular structure 110 is determined individually during the cutting operation.

FIG. 4A-FIG. 4F are schematic top views of different examples of composite tubular structure 110. Specifically, FIG. 4A illustrates a triangular cross-section of composite tubular structure 110. FIG. 4B illustrates a rectangular (e.g., square) cross-section of composite tubular structure 110. FIG. 4C illustrates a pentagon-shaped cross-section of composite tubular structure 110. FIG. 4D illustrates a trapezoid cross-section of composite tubular structure 110. FIG. 4E illustrates a circular cross-section of composite tubular structure 110. FIG. 4F illustrates a half-circular cross-section of composite tubular structure 110.

Method 200 comprises arranging composite tubular structures 110 on support structure 320 (block 230 in FIG. 2). This arrangement of composite tubular structures 110 may be referred to as a grid. The arrangement depends on the type of composite tubular structures 110. Furthermore, the same type of composite tubular structures 110 can be arranged in different ways.

Figure 5A:
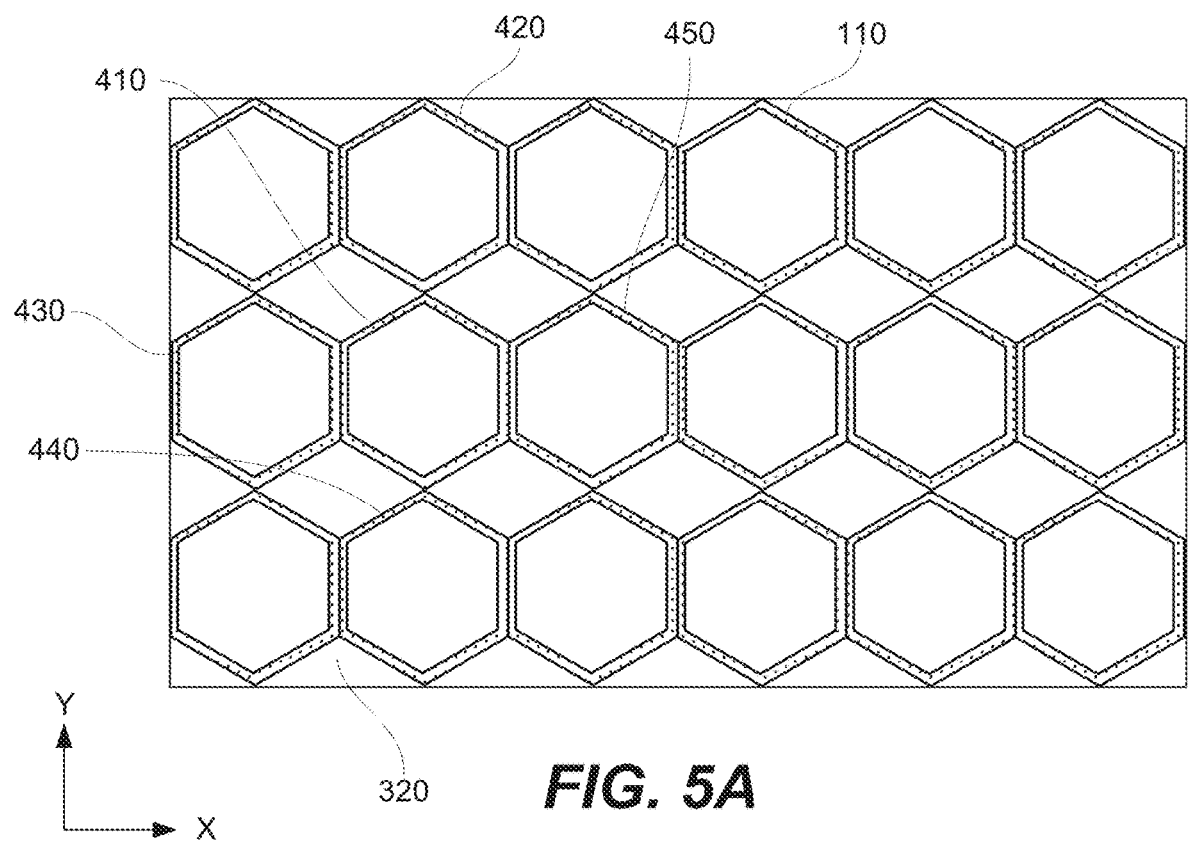
FIG. 5A is a schematic top view of composite tubular structures arranged on a support structure, in accordance with some examples.

FIG. 5A is a top schematic view illustrating one arrangement of composite tubular structures 110 on support structure 320. In this arrangement, composite tubular structures 110 have hexagonal cross-section. A composite tubular structure, which is completely surrounded by other composite tubular structures, has two side walls, directly interfacing with the sides of two adjacent composite tubular structures. Furthermore, two wall edges, positioned in between these sides, directly interface with the wall edges of two other adjacent composite tubular structures.

Specifically, first composite tubular structure 410 is surrounded and directly contacts four other structures, i.e., second composite tubular structure 420, third composite tubular structure 430, fourth composite tubular structure 440, and fifth composite tubular structure 450. One side wall (the left one in FIG. 5A) of first composite tubular structure 410 directly interfaces with a side wall of third composite tubular structure 430, while another side (the right one in FIG. 5A) of composite tubular structure 410 directly interfaces with a side of fifth composite tubular structure 450. A wall edge (the top one in FIG. 5A) of first composite tubular structure 410 directly interfaces with a wall edge of second composite tubular structure 420, while another wall edge (the bottom one in FIG. 5A) of first composite tubular structure 410 directly interfaces with a wall edge of fourth composite tubular structure 440.

Figure 5B:
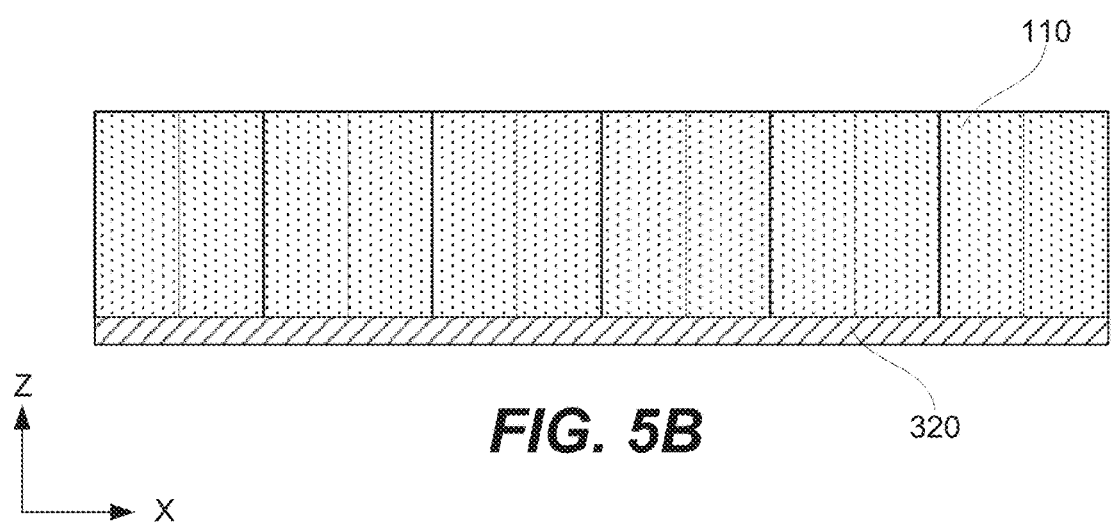
FIG. 5B is a schematic cross-sectional side view of composite tubular structures arranged on a support structure, in accordance with some examples.

FIG. 5B illustrates a cross-sectional schematic view of composite tubular structures 110, arranged on support structure 320. It should be noted that only one row of composite tubular structures 110 is visible in figure. All composite tubular structures 110 are in direct contact with support structure 320, which is either one of the face sheets or a temporary structure (which is removed later). In this example, support structure 320 has a planar surface, interfacing and supporting composite tubular structures 110. FIG. 6B illustrates an examples of a non-planar support structure 320. In this example, composite tubular structures 110 are still able to interface with the surface of support structure 320.

Figure 5C:
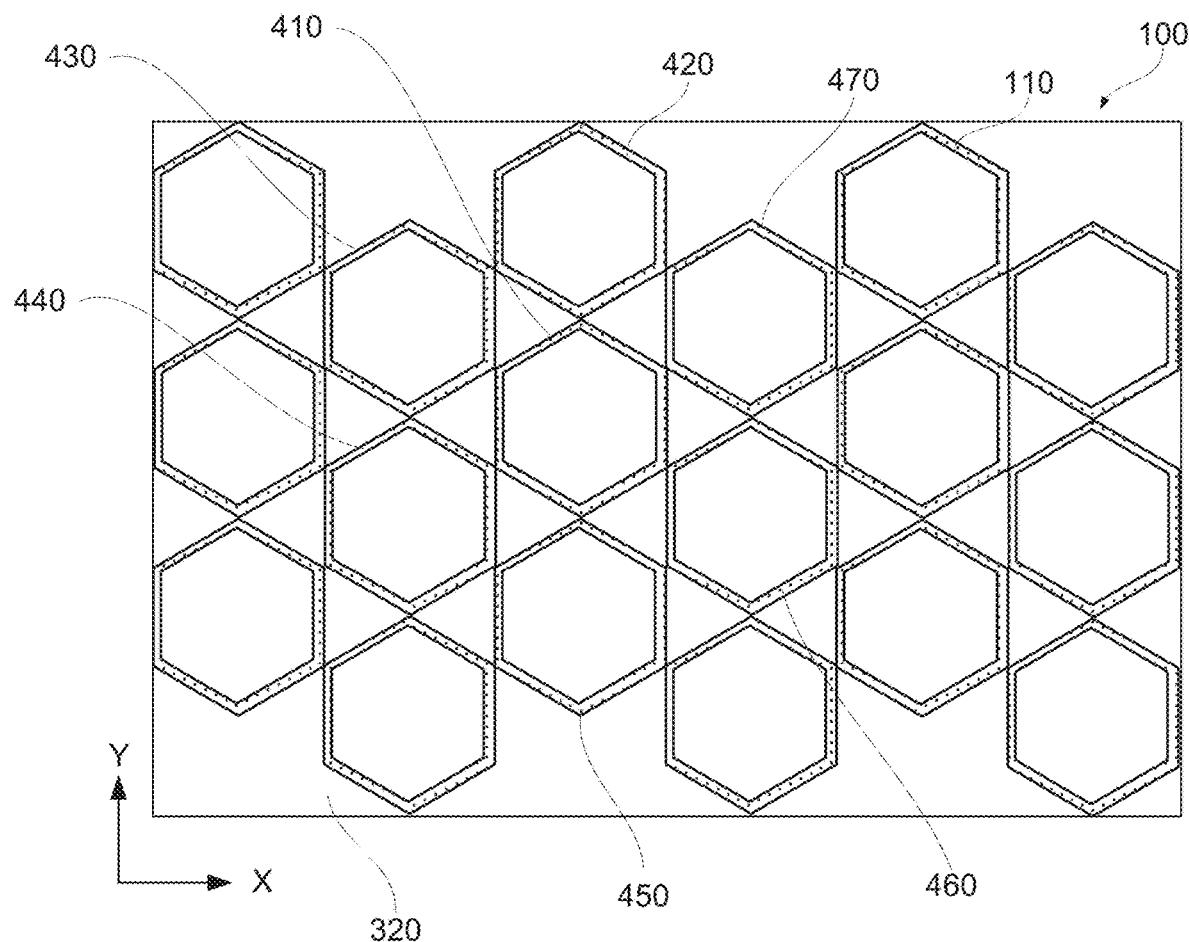
FIG. 5C-FIG. 5E are schematic top views of composite tubular structures arranged on a support structure, in accordance with different examples.
Figure 5D:
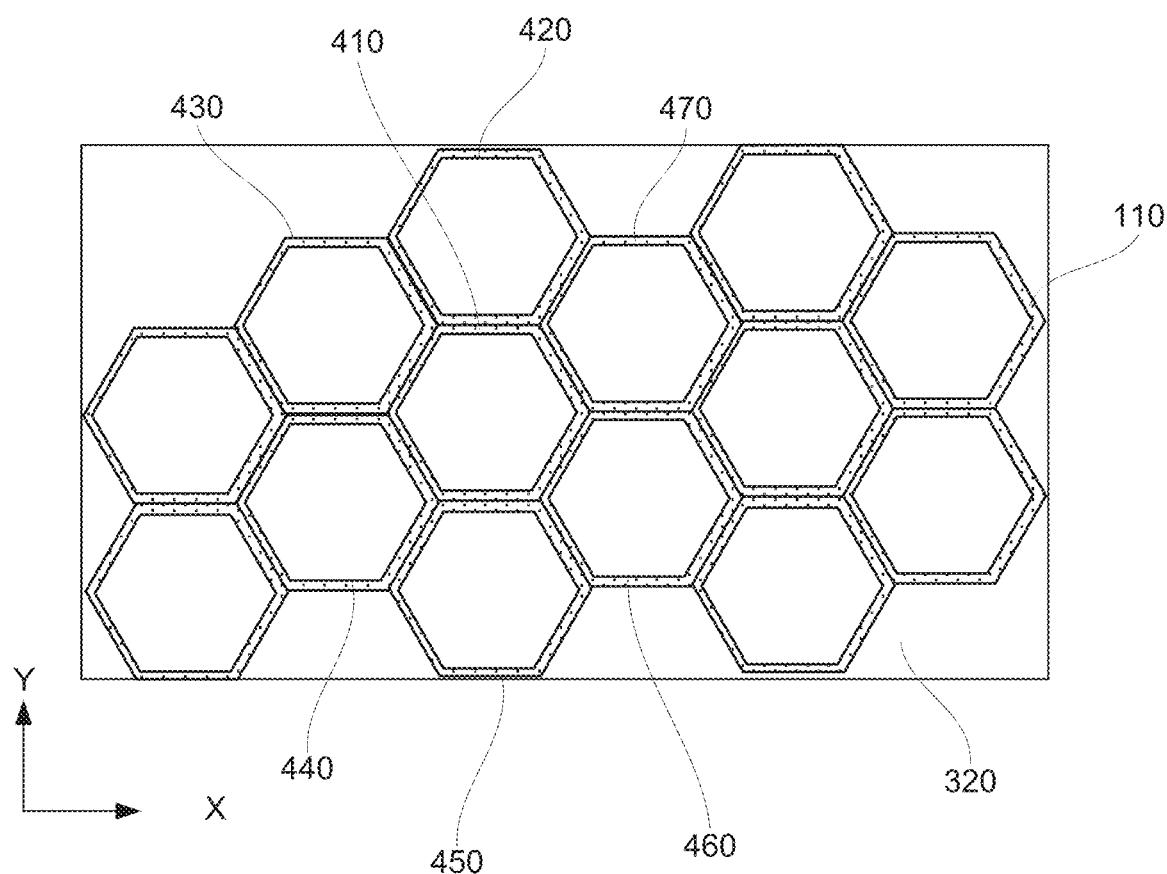
Figure 5E:
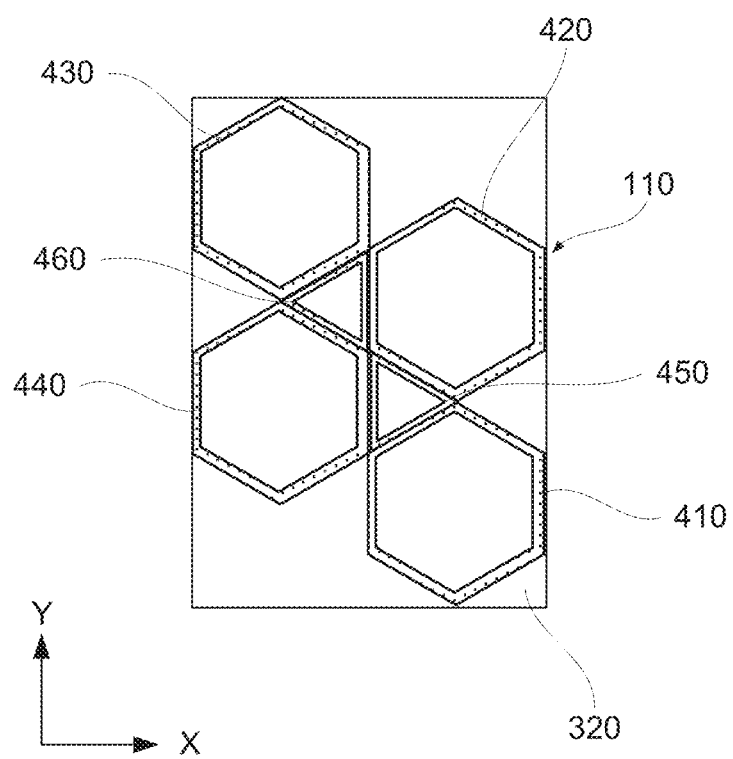

FIG. 5C-FIG. 5E are top schematic views illustrating other arrangements of composite tubular structures 110 on support structure 320. It should be noted that composite tubular structures 110 at least in FIG. 5A, FIG. 5C, and FIG. 5D are the same. FIG. 5E shows an arrangement of two different types of composite tubular structures 110 in the same grid.

Referring to FIG. 5C, first composite tubular structure 410 is surrounded and directly contacts six other structures, i.e., second composite tubular structure 420, third composite tubular structure 430, fourth composite tubular structure 440, fifth composite tubular structure 450, sixth composite tubular structure 460, and seventh composite tubular structure 470. The direct contact with each of these surrounding tubular structures is through wall edges. Otherwise, there is surface-to-surface contact between side walls of these structures.

Referring to FIG. 5D, first composite tubular structure 410 is also surrounded and directly contacts six other structures, i.e., second composite tubular structure 420, third composite tubular structure 430, fourth composite tubular structure 440, fifth composite tubular structure 450, sixth composite tubular structure 460, and seventh composite tubular structure 470. In this example, the direct contact with each of these surrounding tubular structures is through side wall surfaces. Comparing to other examples described above, this grid provides the most surface interface between composite tubular structures and the highest density.

FIG. 5E is a schematic top view of a grid formed by two types of composite tubular structures, in accordance with some examples. First composite tubular structure 410, second composite tubular structure 420, third composite tubular structure 430, and fourth composite tubular structure 440 have hexagonal cross-sectional profiles, while fifth composite tubular structure 450 and sixth composite tubular structure 460 have triangular cross-sectional profiles. Without fifth composite tubular structure 450 and sixth composite tubular structure 460, the grid formed by first composite tubular structure 410, second composite tubular structure 420, third composite tubular structure 430, and fourth composite tubular structure 440 would be the same as in FIG. 5C. For example, first composite tubular structure 410 has an edge contact with second composite tubular structure 420 and, separately, with fourth composite tubular structure 440. Addition of fifth composite tubular structure 450 and sixth composite tubular structure 460 provides direct side contact between the structures, e.g., fifth composite tubular structure 450 has a surface contact with each of first composite tubular structure 410, second composite tubular structure 420, and fourth composite tubular structure 440. It should be noted that in this example, fifth composite tubular structure 450 and sixth composite tubular structure 460 also have an edge contact between each other.

It should be noted that a variety of grid arrangements shown in FIG. 5A and FIG. 5C—FIG. 5E is not possible with conventional expansion and corrugation methods. Conventional expansion and corrugation methods are typically limited to hexagonal honeycomb cells with side contacts, similar to the one shown in FIG. 5D.

Method 200 comprises bonding composite tubular structures 110 to each other (block 241 in FIG. 2). Specifically, in some examples, composite tubular structures 110 are residually cured (block 248) during this operation, e.g., until composite tubular structures 110 are fully cured. It should be noted that, in some examples, composite tubular structures 110 are partially cured prior to the bonding operation. The bonding operation fully cures these partially cured structures, which also bonds these structures together. Overall, this bonding operation may be also referred to as co-curing, where composite tubular structures 110 are all cured together and in contact with each other. In some examples, this bonding operation forms a monolithic grid from composite tubular structures 110.

In some examples, method 200 comprises applying an adhesive at interfaces between composite tubular structures 110 (block 240 in FIG. 2). Furthermore, an adhesive is applied at interfaces between composite tubular structures 110 and each of composite face sheets, if present. For example, composite tubular structures 110 are fully cured in the previous operation (block 218) and there is no residual adhesive available at the interfaces. Furthermore, if composite tubular structures 110 are partially cured, the residual adhesive is not sufficient in some examples.

In some examples, this bonding operation is performed using an in-situ adhesive of composite tubular structures 110. In these examples, prior to the bonding operation, composite tubular structures 110 are partially cured, while some adhesive of composite tubular structures 110 is not fully cross-linked or even solidified. This adhesive remains in the partially-cured composite tubular structures. At least some of this adhesive is available at edge contacts and/or surface contacts between composite tubular structures 110, when composite tubular structures 110 are bonded together.

Figure 6E:
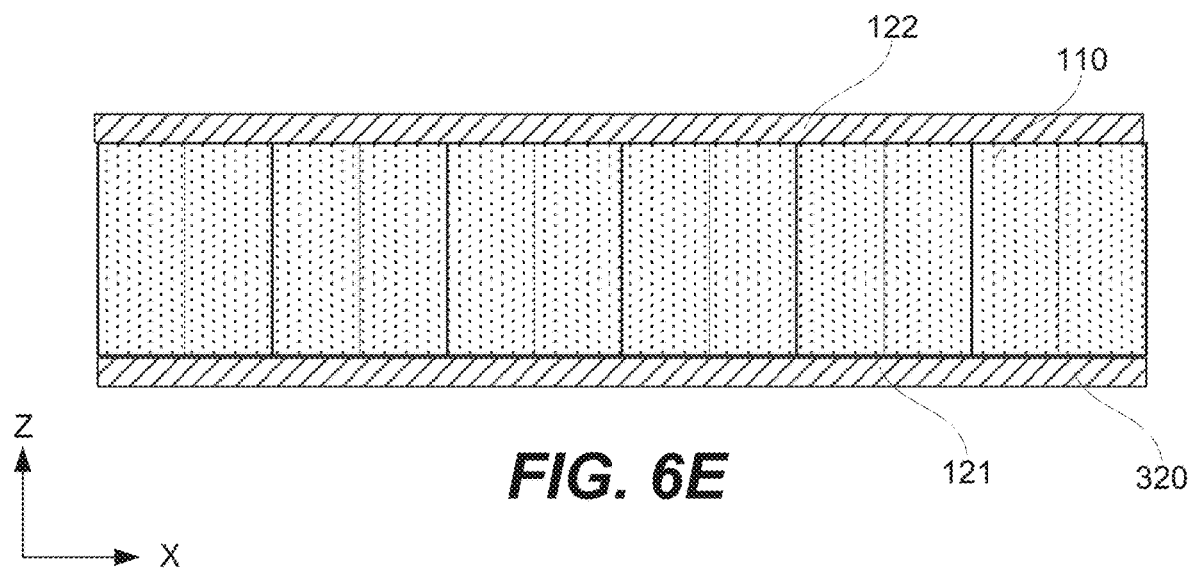
FIG. 6E is a schematic side view of composite tubular structures, arranged between two composite face sheets, in accordance with some examples.

In some examples, support structure 320 is first composite face sheet 121. In these examples, method further comprises bonding composite tubular structures 110 to first composite face sheet 121 (block 242 in FIG. 2). Various examples of composite face sheets are within the scope. In some examples, the composition of first composite face sheet 121 is substantially the same as composite tubular structures 110. Furthermore, in some examples schematically shown in FIG. 6E, composite tubular structures 110 are disposed between first composite face sheet 121 and second composite face sheet 122. In these examples, method 200 further comprises bonding composite tubular structures 110 to second composite face sheet 122 (block 244 in FIG. 2). It should be noted that bonding to first composite face sheet 121 and second composite face sheet 122 is performed while composite tubular structures 110 are also bonded together. Overall, bonding composite tubular structures 110 to each other, to first composite face sheet 121, and to second composite face sheet 122 comprises co-curing composite tubular structures 110, first composite face sheet 121, and second composite face sheet 122.

Figure 7A:
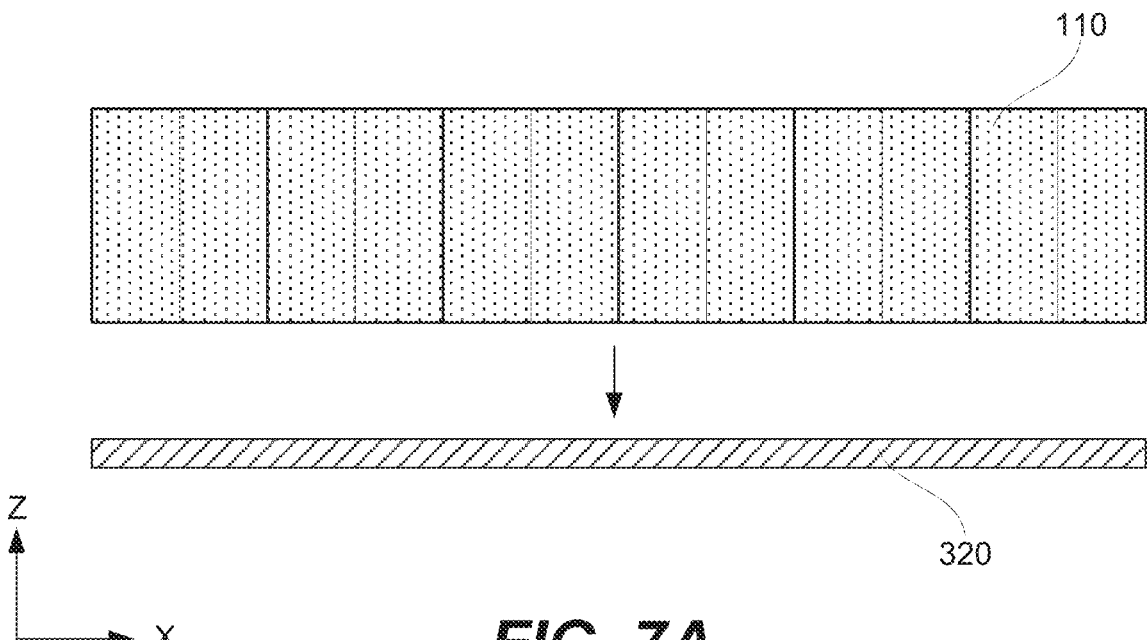
FIG. 7A and FIG. 7B are schematic side views of two examples of bonded composite tubular structures, showing removal of a temporary support structure, in accordance with some examples.
Figure 7B:
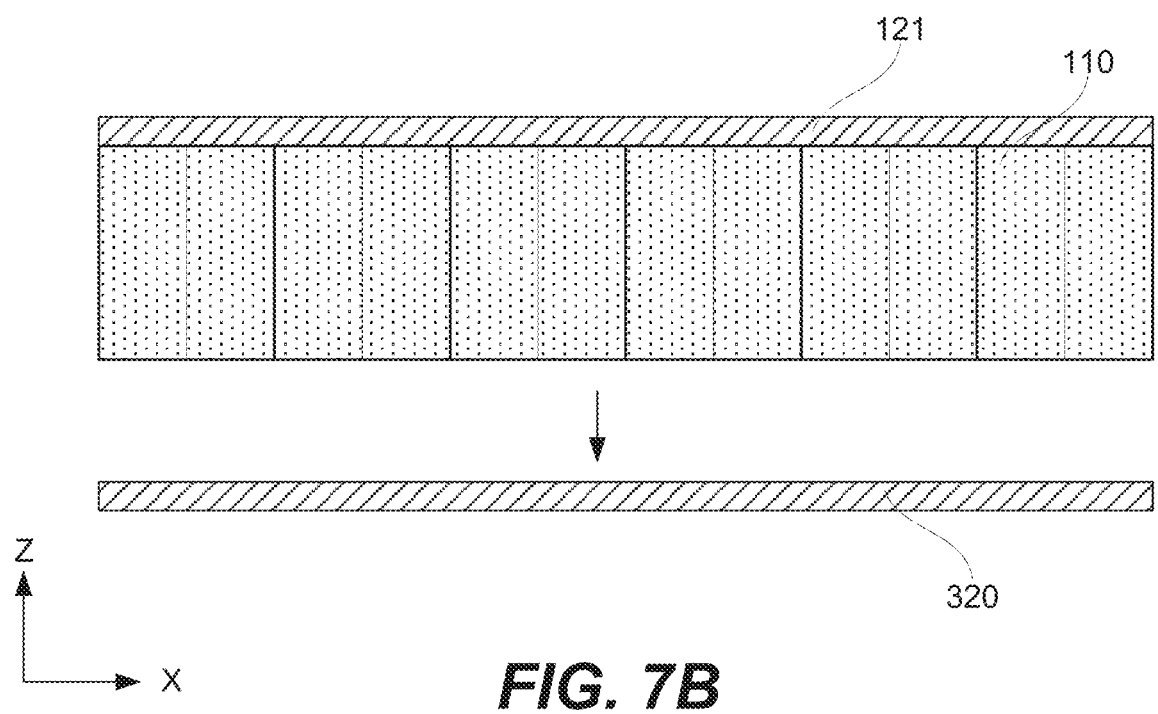

In some examples, method 200 further comprises separating support structure 320 from composite tubular structures 110 (block 250 in FIG. 2), e.g., after bonding composite tubular structures 110 to each other. For example, support structure 320 is a temporary support, which is not a part of composite structural panel 100. In some examples, support structure 320 is replaced with a face sheet, e.g., first composite face sheet 121 or second composite face sheet 122. This operation is schematically shown in FIG. 7A and FIG. 7B. Specifically, FIG. 7A illustrates composite tubular structures 110, bonded together and not interfacing any face sheets. FIG. 7B illustrates composite tubular structures 110, bonded together and interfacing only one face sheet, i.e., first composite face sheet 121.

Examples of Composite Structural Panels

Figure 8A:
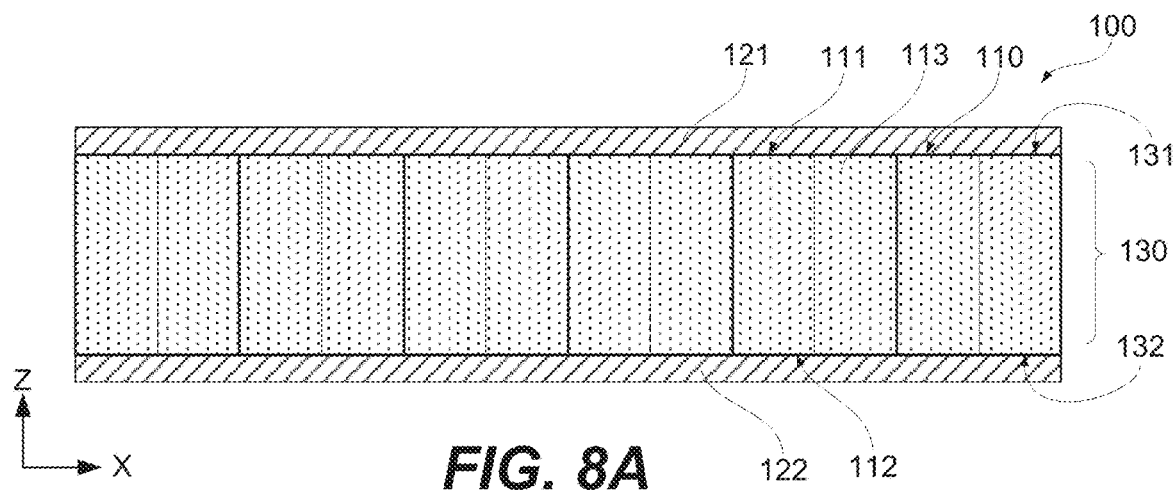
FIG. 8A is a schematic side view of a composite structural panel, including two composite face sheets, in accordance with some examples.
Figure 8B:
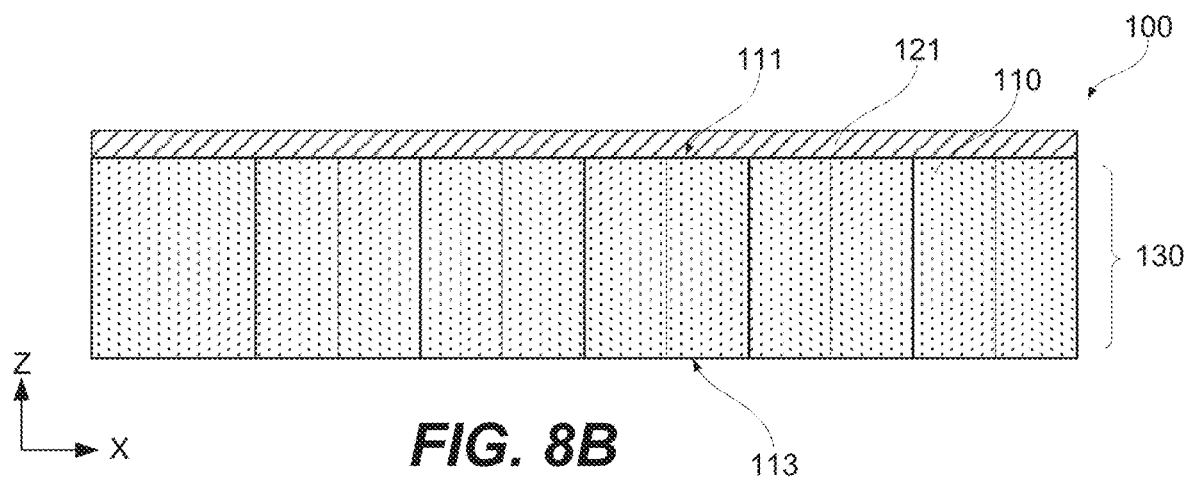
FIG. 8B is a schematic side view of a composite structural panel, including only one composite face sheet, in accordance with some examples.
Figure 8C:
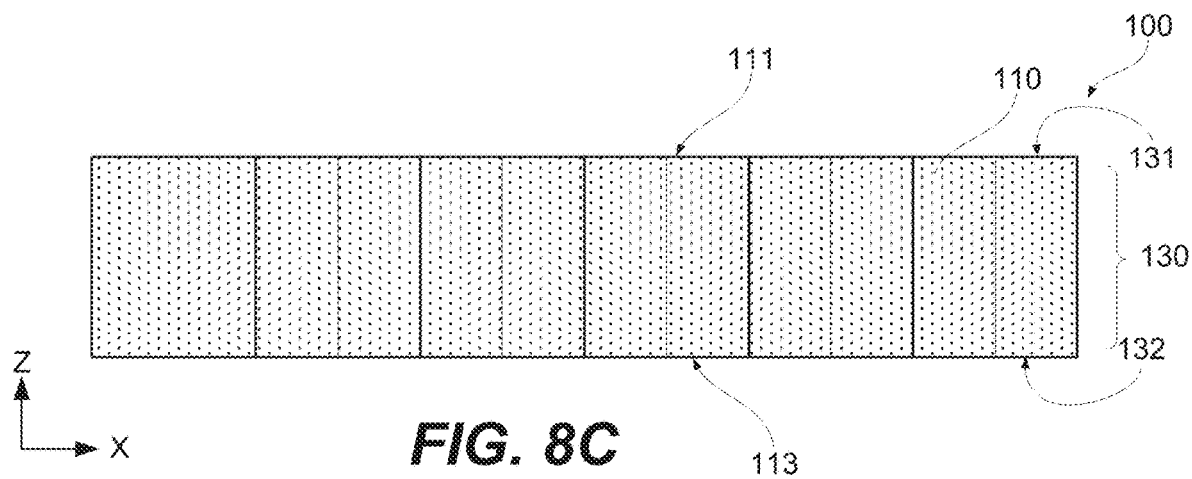
FIG. 8C is a schematic side view of a composite structural panel, including no composite face sheets, in accordance with some examples.

FIG. 8A FIG. 8C are schematic cross-sectional side views of three different examples of composite structural panel 100. In all examples, composite structural panel 100 comprises composite tubular structures 110, directly contacting and bonded to each other, thereby forming interconnected grid 130. Interconnected grid 130 comprises first grid surface 131 and second grid surface 132, opposite of first grid surface 131. In all three examples, first grid surface 131 and second grid surface 132 are planar and are parallel to each other. However, in other examples, e.g., further described below with reference to FIG. 9A, at least one of first grid surface 131 and second grid surface 132 is non-planar.

Each of composite tubular structures 110 comprises first end 111 and second end 112, opposite of first end 111. First end 111 of each of composite tubular structures 110 forms or represents a part of first grid surface 131. Similarly, second end 112 of each of composite tubular structures 110 forms or represents a part of second grid surface 132. Furthermore, each of composite tubular structures 110 comprises composite wall 113, extending between first end 111 and second end 112.

Figure 8D:
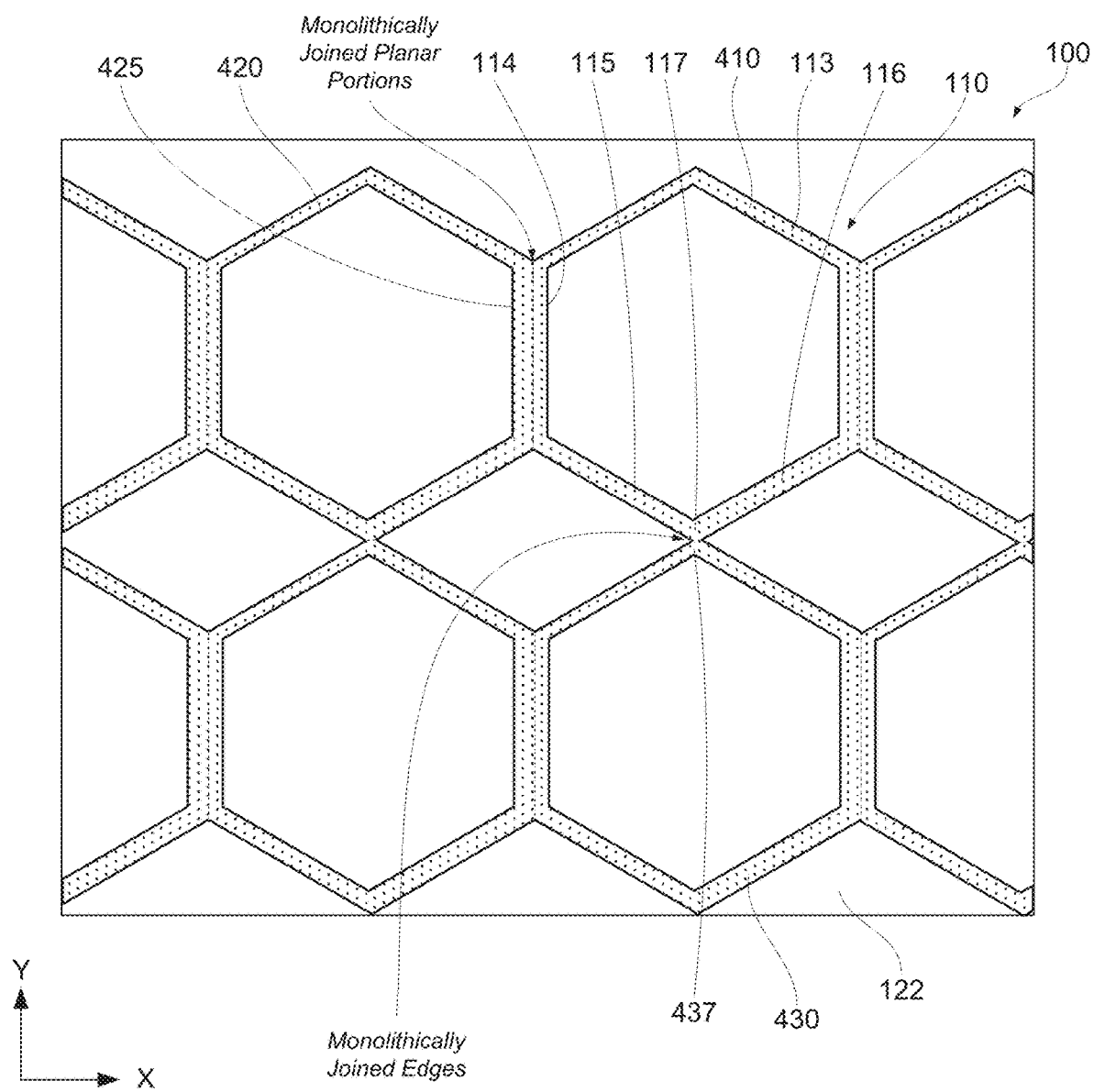
FIG. 8D-8F are schematic top views of different examples of a composite structural panel, showing different arrangements and bonding of composite tubular structures.

Briefly referring to FIG. 8D, composite wall 113 forms perimetrically enclosed space 120. Composite wall 113 of each of composite tubular structures 110 is monolithically joined with one or more composite walls of adjacent ones of composite tubular structures 110 as further described below with reference to FIG. 8-FIG. 8F. It should be noted that various features described above with reference to composite tubular structures 110, prior to their bonding, apply to composite tubular structures 110, after their bonding and forming interconnected grid 130. In some examples, composite tubular structures 110 retain their cross-section, length, and arrangement with respect to other structures during the bonding operation. However, the interconnection between composite tubular structures 110 and the mechanical characteristics of composite tubular structures 110 change during the bonding operation, which also fully cures composite tubular structures 110.

FIG. 8A illustrates an example in which composite structural panel 100 also comprises first composite face sheet 121 and second composite face sheet 122. First end 111 of each of composite tubular structures 110 interfaces with and bonded (e.g., monolithically joined) to first composite face sheet 121. Similarly, second end 112 of each of composite tubular structures 110 interfaces with and bonded (e.g., monolithically joined) to second composite face sheet 122. In this example, perimetrically enclosed spaces 120, formed by composite walls 113, are sealed off from the environment by first composite face sheet 121 and second composite face sheet 122.

In FIG. 8B, composite structural panel 100 comprises composite tubular structures 110 and only one composite face sheet, e.g., first composite face sheet 121. First end 111 of each of composite structural panel 100 interfaces with and bonded (e.g., monolithically joined) to first composite face sheet 121. Second end 112 of each of composite structural panel 100 is exposed, e.g., providing access to the perimetrically enclosed spaces. In some examples, second end 112 of each of composite structural panel 100 is later bonded to another structure.

In FIG. 8C, composite structural panel 100 comprises composite tubular structures 110 and no composite face sheets. In this example, interconnected grid 130 of composite tubular structures 110 represents the entire composite structural panel 100. Both first end 111 and second end 112 of each of composite structural panel 100 (as well as first grid surface 131 and second grid surface 132) are exposed, e.g., providing access to perimetrically enclosed spaces, formed by composite walls 113. This composite structural panel 100 allows passage of materials between first grid surface 131 and second grid surface 132.

Figure 8E:
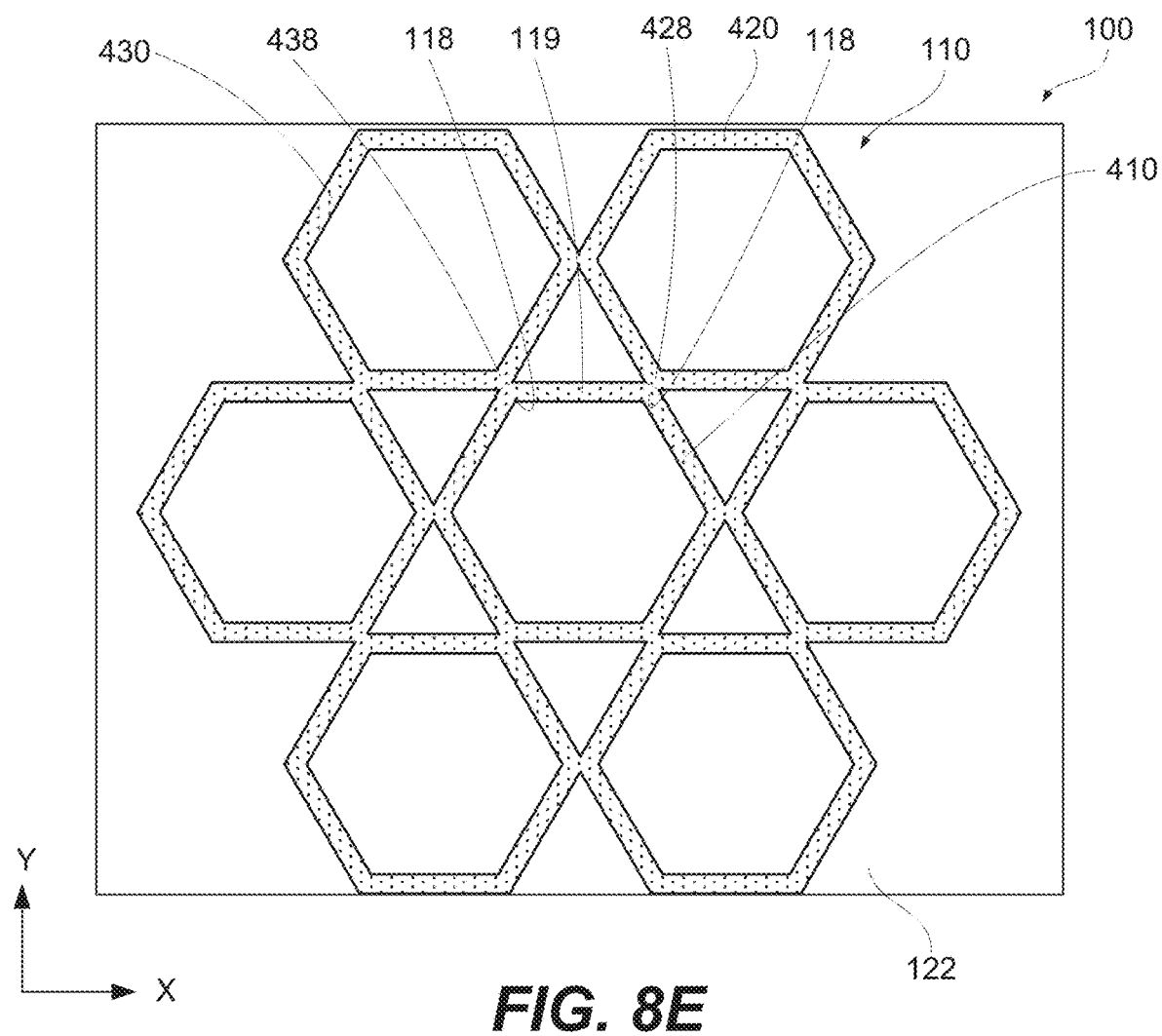
Figure 8F:
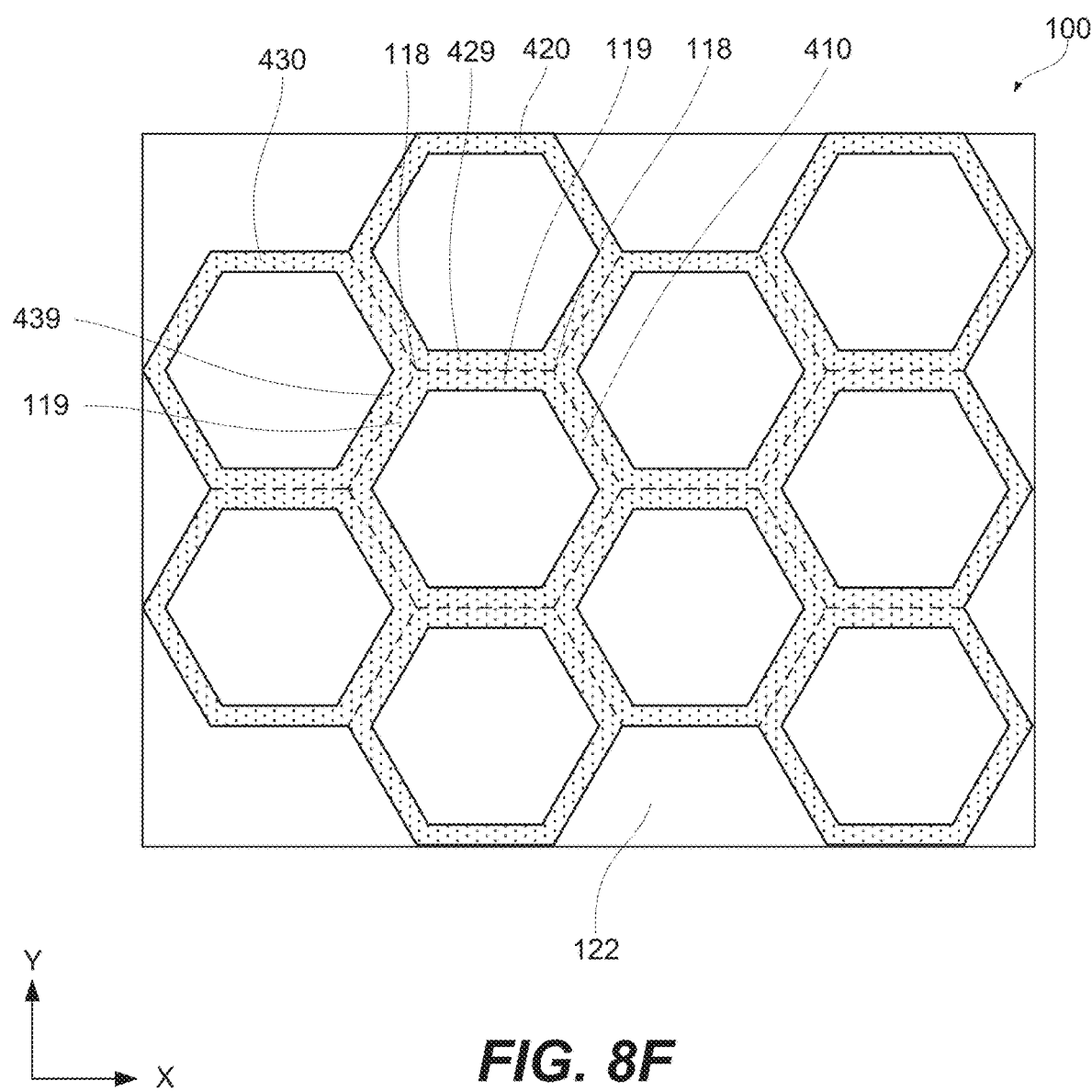

As noted above, composite tubular structures 110 are bonded (e.g., monolithically joined) within interconnected grid 130. The cross-sectional shape and arrangement of composite tubular structures 110 cause different types of bonding as will now be described with reference to FIG. 8D-FIG. 5F. Specifically, FIG. 8D-FIG. 8F are schematic cross-sectional top views of composite structural panel 100, showing different bonded arrangements of composite tubular structures 110 in composite structural panel 100. The bonded arrangement in FIG. 8D generally corresponds to the pre-bonded arrangement of composite tubular structures 110 shown in FIG. 5A. The bonded arrangement in FIG. 5E generally corresponds to the pre-bonded arrangement of composite tubular structures 110 shown in FIG. 5C. Finally, the bonded arrangement in FIG. 8F generally corresponds to the pre-bonded arrangement of composite tubular structures 110 shown in FIG. 5D. One having ordinary skill in the art would understand that other arrangements are also within the scope. It should be noted the pre-bonded arrangement determines the bonded arrangement and characteristics of composite structural panel 100.

All three of FIG. 8D-FIG. 8F illustrate composite tubular structures 110, each having a hexagonal cross-section. However, other shapes are also within the scope. One having ordinary skill in the art would understand various arrangements and bonding possible among other types of structures, such as structures shown in FIG. 4A-4F.

Referring to FIG. 8D, composite wall 113 of each of composite tubular structures 110 (e.g., first composite tubular structure 410) comprises first planar portion 114. First planar portion 114 of first composite tubular structure 410 is monolithically joined with planar portion 425 of an adjacent one (second composite tubular structure 420) of composite tubular structures 110. This monolithic joint extends between edges defining each of first planar portion 114 and planar portion 425 and may be referred to as a side monolithic joint.

Furthermore, referring to FIG. 8D, composite wall 113 of each of composite tubular structures 110 (e.g., first composite tubular structure 410) comprises second planar portion 115 and third planar portion 116, forming edge 117. Edge 117 of first composite tubular structure 410 is monolithically joined with edge 437 of an adjacent one (third composite tubular structure 430) of composite tubular structures 110. This monolithic joint is smaller than the side monolithic joint. This monolithic joint between edge 117 of first composite tubular structure 410 and edge 437 of third composite tubular structure 430 may be referred to as an edge joint.

Referring to FIG. 8E and FIG. 8F, composite wall 113 of each of composite tubular structures 110 (e.g., first composite tubular structure 410) comprises multiple edges 118 and multiple planar portions 119. Each adjacent pair of multiple planar portions 119 is separated by one of multiple edges 118. Similarly, each adjacent pair of multiple edges 118 is separated by one of multiple planar portions 119. While FIG. 8E illustrates a hexagonal cross-sectional profile of composite wall 113, any polygonal profile is within the scope of this example.

In the example of FIG. 8E, each of multiple edges 118 of at least one of composite tubular structures 110 (e.g., first composite tubular structure 410) is monolithically joined with an edge of an adjacent one of the composite tubular structures 110. Specifically, top-right edge 118 of first composite tubular structure 410 is monolithically joined with edge 428 of second composite tubular structure 420. Top-left edge 118 of first composite tubular structure 410 is monolithically joined with edge 438 of third composite tubular structure 430, and so on. Overall, each of six edges 118 of first composite tubular structure 410 is monolithically joined with an edge of one of composite tubular structures surrounding first composite tubular structure 410.

In the example of FIG. 8F, each of multiple planar portions 119 of at least one of composite tubular structures 110 (e.g., first composite tubular structure 410) is monolithically joined with a planar portion of an adjacent one of composite tubular structures 110. Specifically, top planar portion 119 of first composite tubular structure 410 is monolithically joined with planar portion 429 of second composite tubular structure 420. Top-left planar portion 119 of first composite tubular structure 410 is monolithically joined with planar portion 439 of third composite tubular structure 430, and so on. Overall, each of six planar portions 119 of first composite tubular structure 410 is monolithically joined with a planar portion of one of composite tubular structures surrounding first composite tubular structure 410.

Figure 9A:
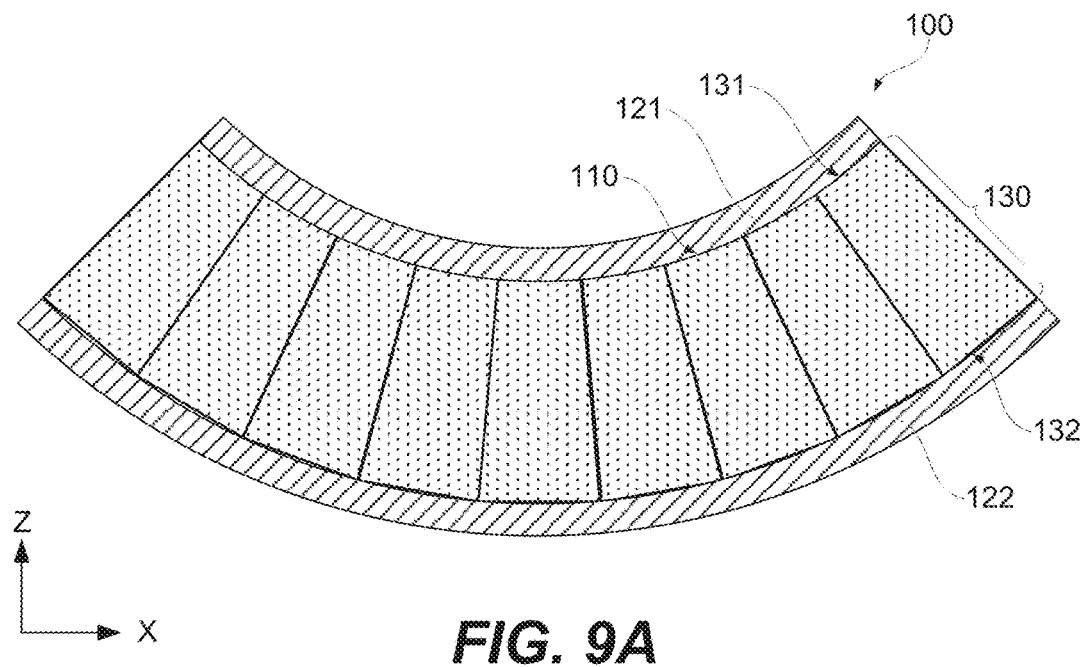
FIG. 9A is a schematic side view of a composite structural panel, comprising nonplanar (e.g., curved) composite face sheets, in accordance with some examples.

In some examples, first composite face sheet 121 is non-planar, e.g., as shown in FIG. 9A. First composite face sheet 121 conforms to first grid surface 131, which is also non-planar in this example, Such interconnected grid 130 is formed, e.g., by composite tubular structures 110, which have a tapered profile, as described above with reference to FIGS. 6A and 6B. Furthermore, second composite face sheet 122 is non-planar. Second composite face sheet 122 also conforms to second grid surface 132, which is also non-planar in this example.

Figure 9B:
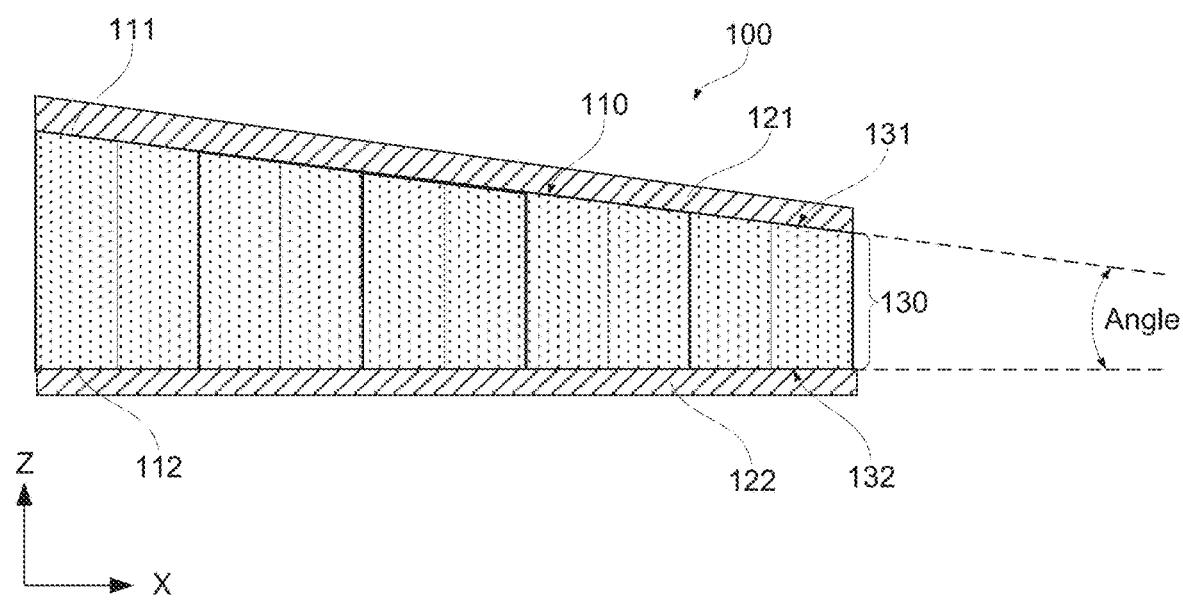
FIG. 9B is a schematic side view of a composite structural panel, two planar composite face sheets that are not parallel to each other, in accordance with some examples.

Referring to FIG. 9B, in some examples, the angle between first grid surface 131 and second grid surface 132 is greater than 0°. In other words, first grid surface 131 and second grid surface 132 are not parallel. In this example, each of first grid surface 131 and second grid surface 132 is planar. However, the distance between first grid surface 131 and second grid surface 132 changes, More specifically, at least two of composite tubular structures 110 in this example have different lengths. The length is defined as a distance between first end 111 and second end 112. In some examples, composite structural panel 100, shown in FIG. 9B, is used as a ramp for joining honeycomb floor grids, e.g., positioned at different elevations along the length of the fuselage. In a specific example, composite structural panel 100 is used as a ramp that joins the flight attendant galley to the passenger floor grid.

Aircraft Examples

In some examples, apparatus and methods described above are used on aircraft and, more generally, by aerospace industry. Specifically, apparatus can be used during fabrication of aircraft as well as during aircraft service and maintenance.

Figure 10:
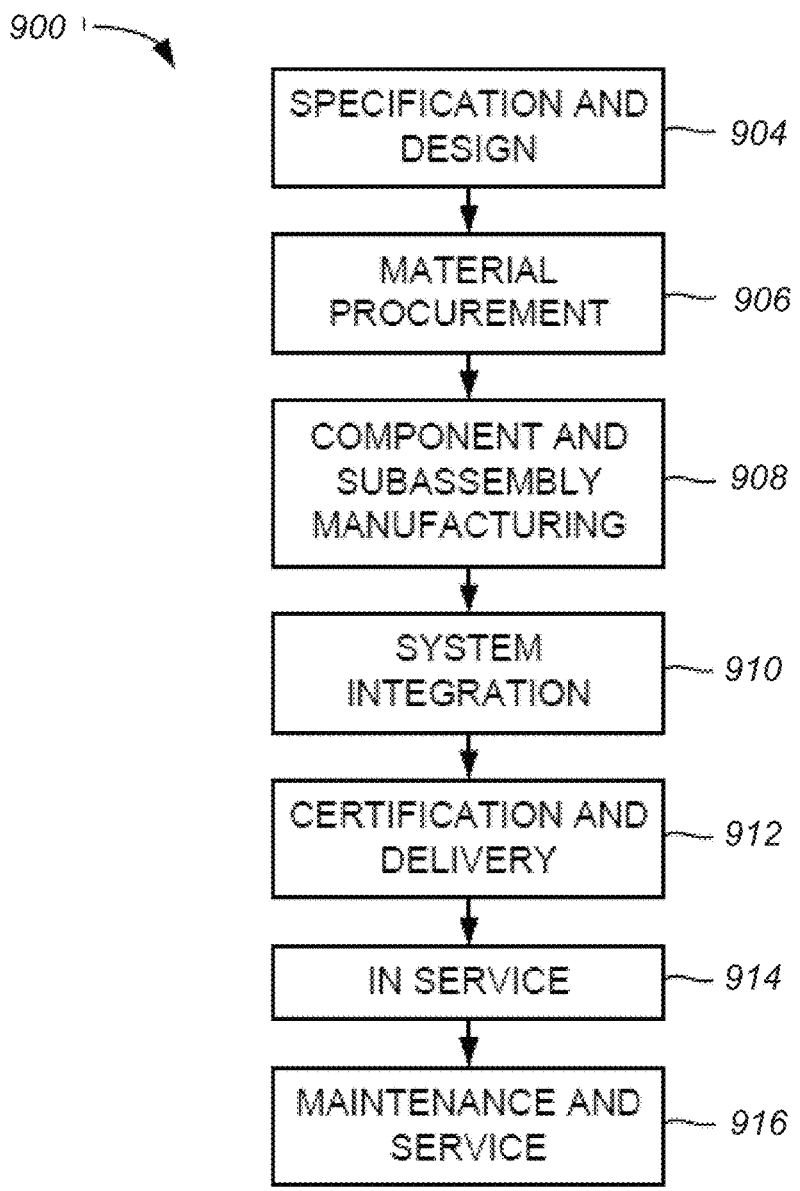
FIG. 10 is a process flowchart corresponding to a method for manufacturing and service the aircraft.
Figure 11:
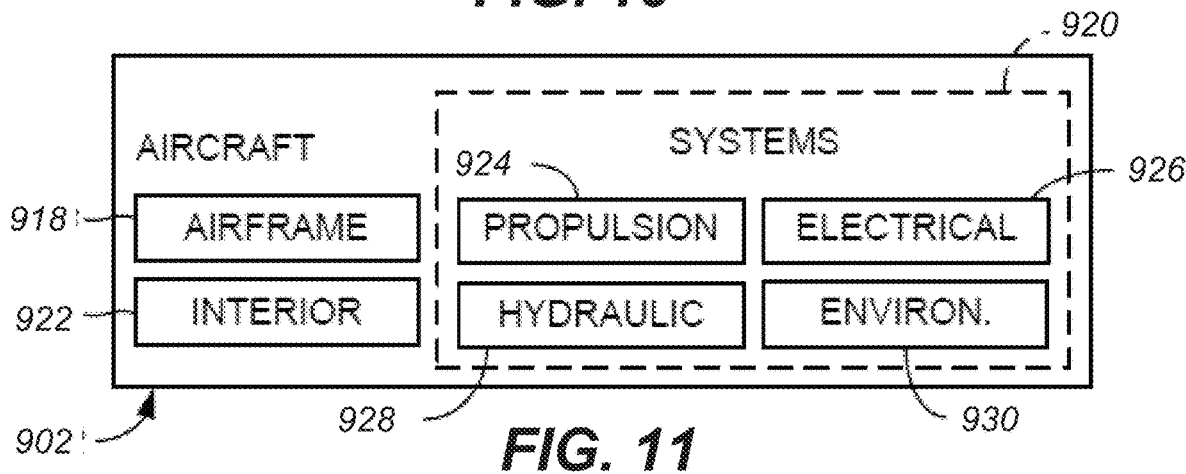
FIG. 11 illustrates a block diagram of an example of an aircraft, in accordance with some examples.

Accordingly, apparatus and methods described above are applicable for aircraft manufacturing and service method 900 as shown in FIG. 10 and for aircraft 902 as shown in FIG. 11. During pre-production, method 900 includes specification and design 904 of aircraft 902 and material procurement 906. During production, component and subassembly manufacturing 908 and system integration 910 of aircraft 902 takes place. Thereafter, aircraft 902 goes through certification and delivery 912 in order to be placed in service 914. While in service by a customer, aircraft 902 is scheduled for routine maintenance and service 916, which also includes modification, reconfiguration, refurbishment, and so on.

In some examples, each of processes of method 900 is performed or carried out by a system integrator, a third party, and/or an operator, e.g., a customer. For purposes of this description, a system integrator may include without limitation any number of aircraft manufacturers and major-system subcontractors; a third party may include without limitation any number of venders, subcontractors, and suppliers; and an operator can be an airline, leasing company, military entity, service organization, and so on.

As shown in FIG. 11, aircraft 902 produced by method 900 includes airframe 918 with plurality of systems 920, and interior 922. Examples of systems 920 include one or more of propulsion system 924, electrical system 926, hydraulic system 928, and environmental system 930. Any number of other systems can be included, Although an aerospace example is shown, principles of examples described herein may be applied to other industries, such as automotive industry.

Apparatus and methods presented herein can be employed during any one or more of stages of method 900. For example, components or subassemblies corresponding to manufacturing 908 are fabricated or manufactured in a manner similar to components or subassemblies produced while aircraft 902 is in service. Also, one or more apparatus examples, method examples, or a combination thereof may be utilized during manufacturing 908 and system integration 910, for example, by substantially expediting assembly of or reducing cost of an aircraft 902. Similarly, one or more of apparatus examples, method examples, or a combination thereof may be utilized while aircraft 902 is in service, for example and without limitation, to maintenance and service 916.

Figure 12A:
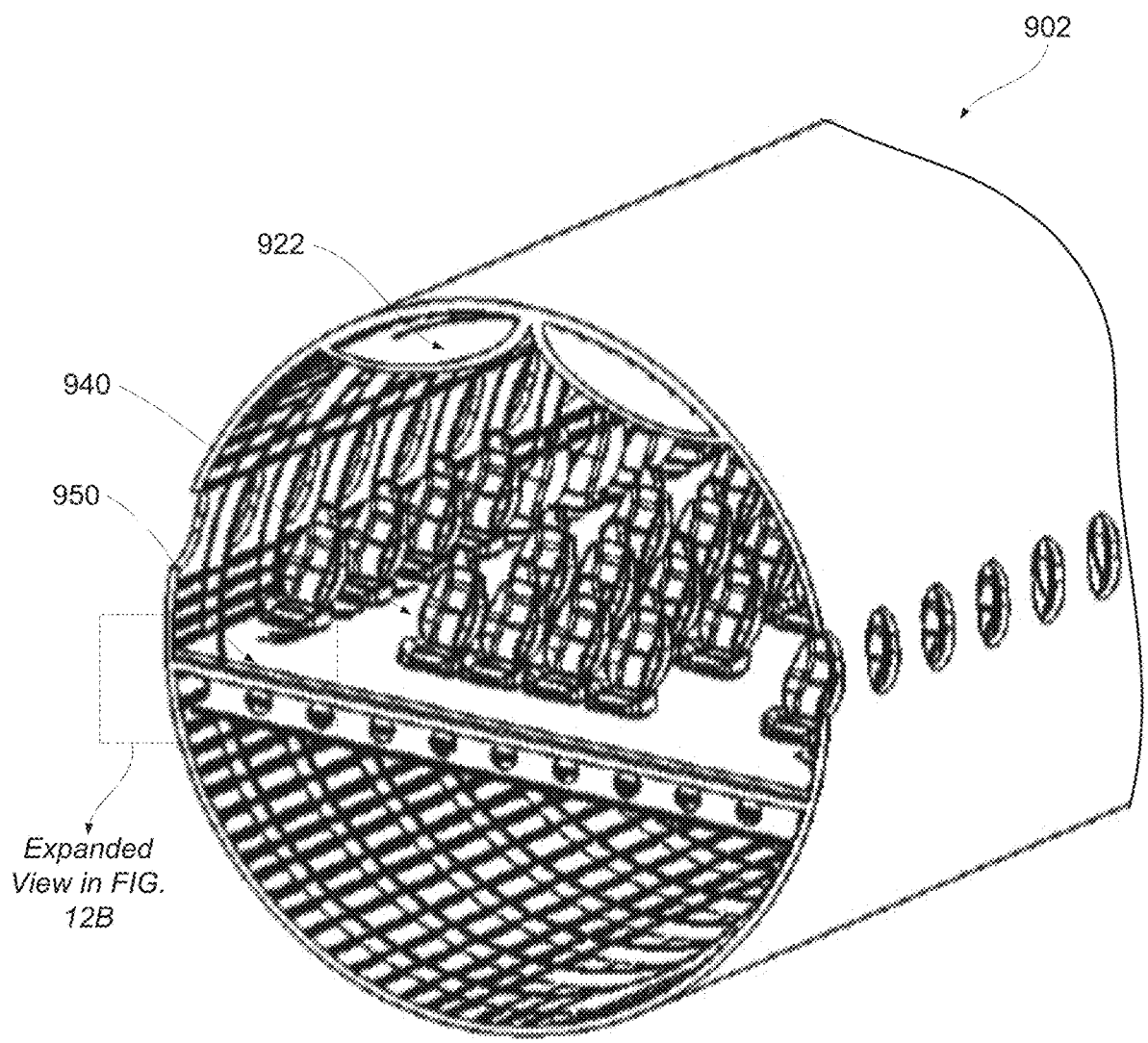
FIG. 12A is a schematic cross-sectional view of an aircraft fuselage, in accordance with some examples.
Figure 12B:
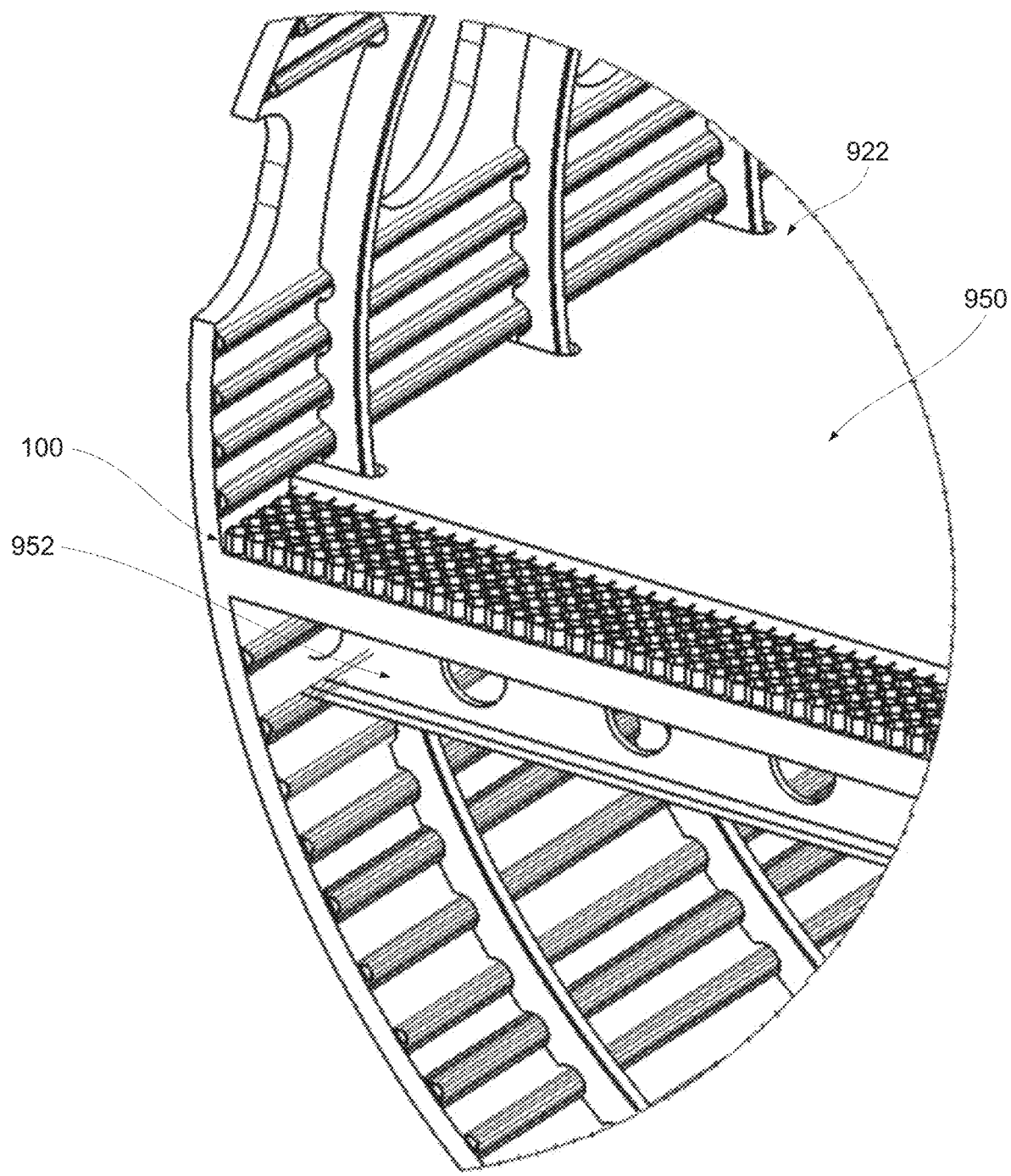
FIG. 12B is an expanded schematic cross-sectional view of the aircraft fuselage of FIG. 11A, illustrating a composite structural panel used as a floor support, in accordance with some examples.
Figure 12C:
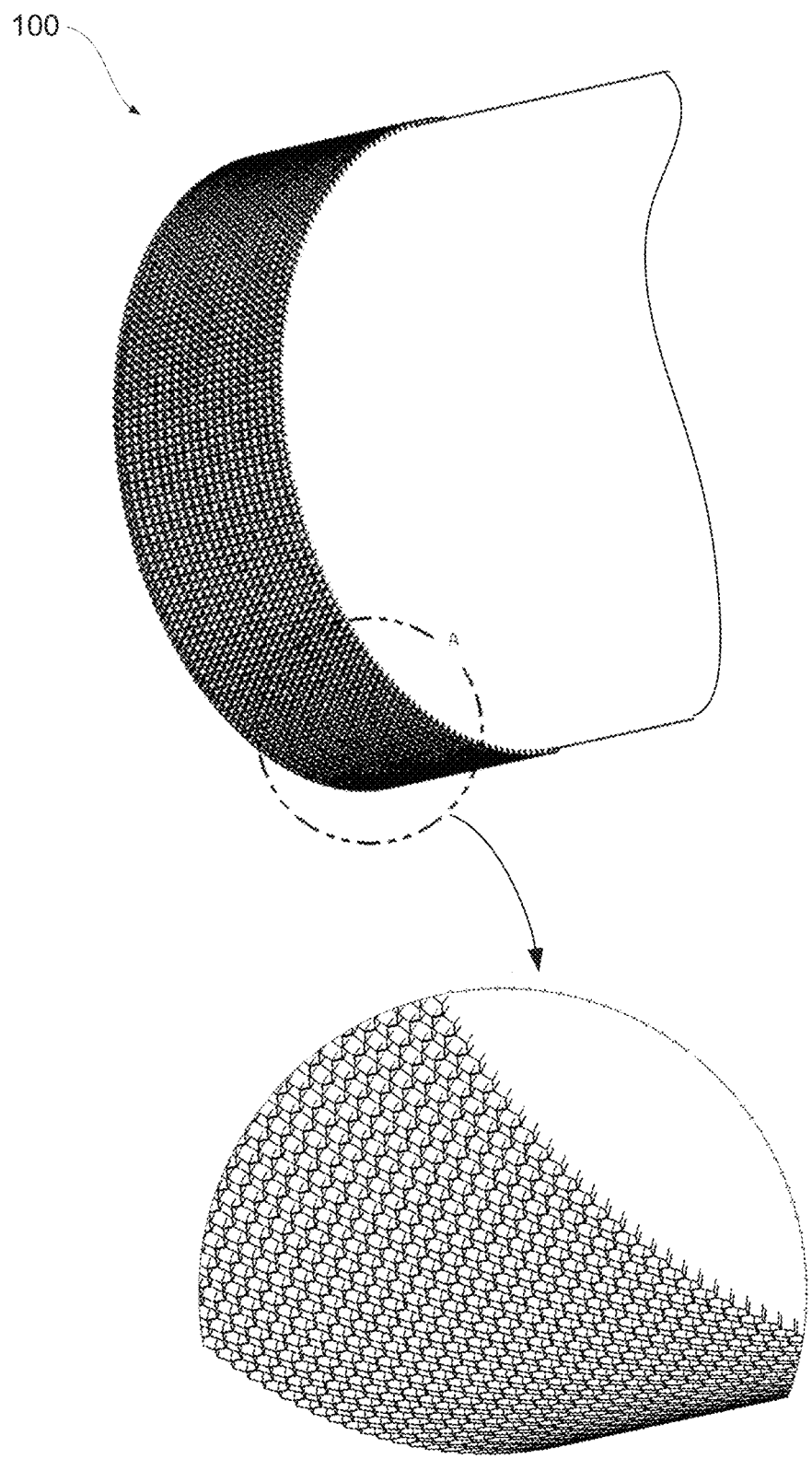
FIG. 12C is an example of a curved composite structural panel, used in a nacelle of an aircraft engine.

FIG. 12A is a schematic cross-sectional view of aircraft 902, illustrating various components of interior 922, such as plurality of seats 940 supported on floor 950. Additional details of floor 950 are shown in FIG. 12B, which is an expanded view of a portion of interior 922. Floor 950 comprises composite structural panel 100, disposed on floor struts 952. Various examples of composite structural panel 100 are described above. FIG. 12C is an example of composite structural panel 100, used as a nacelle of an engine (part of propulsion system 924). In this example, structural panel 100 is curved. Various curved features are described above with reference to FIG. 6A, FIG. 6B, and FIG. 9A.

Further Examples

Further, description includes examples according to following clauses:

Clause 1. Method 200 comprises:
wrapping mandrel 300 with a composite tape 310 to form composite tube 315;
cutting composite tube 315 to form composite tubular structures 110;
arranging composite tubular structures 110 on support structure 320; and
bonding composite tubular structures 110 together by co-curing, co-bonding, or secondary bonding.

Clause 2. Method 200 of clause 1, further comprising, prior to cutting composite tube 315, partially curing composite tube 315.

Clause 3. Method 200 of clause 2, wherein composite tube 315 is partially cured to achieve between 50% and 90% of mechanical properties of the fully cured state.

Clause 4. Method 200 of any one of clauses 1-3, further comprising removing mandrel 300 from composite tube 315.

Clause 5. Method 200 of clause 4, wherein mandrel 300 is removed prior to cutting composite tube 315.

Clause 6. Method 200 of any one of clauses 4-5, wherein mandrel 300 is removed after partially curing composite tube 315.

Clause 7. Method 200 of any one of clauses 1-6, wherein:
each of composite tubular structures 110 comprises composite wall 113, comprising multiple edges 118 and multiple planar portions 119, such that each adjacent pair of multiple planar portions 119 is separated by one of multiple edges 118, and
after arranging composite tubular structures 110, each of multiple edges 118 of at least one of composite tubular structures 110 directly contacts an edge of an adjacent one of composite tubular structures 110.

Clause 8. Method 200 of any one of clauses 1-7, wherein:
each of composite tubular structures 110 comprises composite wall 113, comprising multiple edges 118 and multiple planar portions 119, such that each adjacent pair of multiple planar portions 119 is separated by one of multiple edges 118, and
after arranging composite tubular structures 110, each of multiple planar portions 119 of at least one of composite tubular structures 110 directly contacts a planar portion an adjacent one of composite tubular structures 110.

Clause 9. Method 200 of any one of clauses 1-8, further comprising, after bonding composite tubular structures 110 to each other, separating support structure 320 from composite tubular structures 110.

Clause 10. Method 200 of any one of clauses 1-8,
wherein support structure 320 is a first composite face sheet 121, and
wherein method 200 further comprises bonding composite tubular structures 110 to first composite face sheet 121.

Clause 11. Method 200 of clause 10,
wherein composite tubular structures 110 are arranged between first composite face sheet 121 and second composite face sheet 122, and
wherein method 200 further comprises bonding composite tubular structures 110 to second composite face sheet 122.

Clause 12. Method 200 of clause 11, wherein bonding composite tubular structures 110 to each other, to first composite face sheet 121, and to second composite face sheet 122 comprises co-curing composite tubular structures 110, first composite face sheet 121, and second composite face sheet 122.

Clause 13. Method 200 of any one of clauses 1-12, wherein support structure 320 is non-planar.

Clause 14. Method 200 of any one of clauses 1-13, wherein bonding composite tubular structures 110 to each other is performed using an in-situ adhesive of composite tubular structures 110.

Clause 15. Method 200 of any one of clauses 1-14, wherein bonding composite tubular structures 110 comprises curing composite tubular structures 110.

Clause 16. Method 200 of any one of clauses 1-15, wherein bonding composite tubular structures 110 forms a monolithic grid.

Clause 17. method 200 of any one of clauses 1-16,
wherein mandrel 300 has a length and a cross-section, perpendicular to the length, and
wherein cross-section differs along the length.

Clause 18. Method 200 of clause 17, wherein at least two of composite tubular structures 110, cut from composite tube 315, have different cross-sections.

Clause 19. Method 200 of any one of clauses 1-18, wherein at least two of composite tubular structures 110, cut from composite tube 315, have different lengths.

Clause 20. Method 200 of any one of clauses 1-19, wherein at least one of composite tubular structures 110, cut from composite tube 315, have tapered walls.

Clause 21. A composite structural panel 100 comprising:
composite tubular structures 110, directly contacting and bonded to each other, thereby forming interconnected grid 130, wherein:
  interconnected grid 130 comprises first grid surface 131 and second grid surface 132, opposite of first grid surface 131,
  each of composite tubular structures 110 comprises first end 111 and second end 112, opposite of first end 111, such that first end 111 of each of composite tubular structures 110 forms a part of first grid surface 131, while second end 112 each of composite tubular structures 110 forms a part of second grid surface 132, and
  each of composite tubular structures 110 comprises composite wall 113, extending between first end 111 and second end 112 and forming perimeterically enclosed space 120, such that composite wall 113 is monolithically joined with one or more composite walls of adjacent ones of composite tubular structures 110; and
first composite face sheet 121, disposed over and directly contacting each of composite tubular structures 110 at first end 111, such that first composite face sheet 121 seals perimeterically enclosed space 120 of each of composite tubular structures 110 at first end 111.

Clause 22. Composite structural panel 100 of clause 21, wherein interconnected grid 130 is monolithic.

Clause 23. Composite structural panel 100 of clause 22, wherein interconnected grid 130 is formed by co-curing composite tubular structures 110 together with first composite face sheet 121.

Clause 24. Composite structural panel 100 of any one of clauses 21-23, further comprising second composite face sheet 122, disposed over and directly contacting each of composite tubular structures 110 at second end 112, wherein:

composite tubular structures 110 are disposed between first composite face sheet 121 and second composite face sheet 122, and second composite face sheet 122 seals perimeterically enclosed space 120 of each of composite tubular structures 110 at second end 112.

Clause 25. Composite structural panel 100 of any one of clauses 21-24, wherein composite wall 1:13 of each of composite tubular structures 110 comprises first planar portion 114, monolithically joined with a planar portion of an adjacent one of composite tubular structures 110.

Clause 26. Composite structural panel 100 of clause 25, wherein composite wall 113 of each of composite tubular structures 110 comprises second planar portion 115 and third planar portion 116, forming edge 117, monolithically joined with an edge of an adjacent one of composite tubular structures 110.

Clause 27. Composite structural panel 100 of any one of clauses 21-26, wherein:

composite wall 113 of each of composite tubular structures 110 comprises multiple edges 118 and multiple planar portions 119, such that each adjacent pair of multiple planar portions 119 is separated by one of multiple edges 118, and each of multiple edges 118 of at least one of composite tubular structures 110 is monolithically joined with an edge of an adjacent one of composite tubular structures 110.

Clause 28. Composite structural panel 100 of any one of clauses 21-26, wherein:

composite wall 113 of each of composite tubular structures 110 comprises multiple edges 118 and multiple planar portions 119, such that each adjacent pair of multiple planar portions 119 is separated by one of multiple edges 118, and each of multiple planar portions 119 of at least one of composite tubular structures 110 is monolithically joined with an planar portion of an adjacent one of composite tubular structures 110.

Clause 29. Composite structural panel 100 of any one of clauses 21-28, wherein first composite face sheet 121 is non-planar.

Clause 30. Composite structural panel 100 of any one of clauses 21-28, wherein each of first grid surface 131 and second grid surface 132 is planar and parallel to each other.

Clause 31. Composite structural panel 100 of any one of clauses 21-28, wherein each of first grid surface 131 and second grid surface 132 is planar, and wherein the angle between first grid surface 131 and second grid surface 132 is greater than 0'.

Clause 32. Composite structural panel 100 of any one of clauses 21-29, wherein at least two of composite tubular structures 110 have different lengths, extending between first end 111 and second end 112.

CONCLUSION

Although foregoing concepts have been described in some detail for purposes of clarity of understanding, it will be apparent that certain changes and modifications may be practiced within scope of appended claims. It should be noted that there are many alternative ways of implementing processes, systems, and apparatus. Accordingly, present examples are to be considered as illustrative and not restrictive.

What is claimed is:

1. A method comprising:

wrapping a mandrel with a composite tape to form a composite tube;

cutting the composite tube to form composite tubular structures, wherein each of the composite tubular structures comprises a polygonal cross-section having a plurality of planar portions perpendicular to the polygonal cross-section, each adjacent pair of the planar portions being connected by an edge joint;

arranging the composite tubular structures on a support structure; and bonding the composite tubular structures together by co-curing, co-bonding, or secondary bonding, wherein the composite tubular structures are arranged and bonded together so that at least some of the bonded composite tubular structures are bonded together along adjacent planar portions and at least some of the composite tubular structures are bonded together along adjacent edge joints.

2. The method of claim 1, further comprising, prior to cutting the composite tube, curing the composite tube.

3. The method of claim 2, wherein curing the composite tube comprises partial curing of the composite tube to achieve between 50% and 90% of mechanical properties of a fully cured state.

4. The method of claim 1, further comprising removing the mandrel from the composite tube prior to cutting the composite tube.

5. The method of claim 4, further comprising removing the mandrel from the composite tube after curing the composite tube.

6. The method of claim 1, wherein the composite tubular structures have different cross-sections.

7. The method of claim 1, wherein the support structure is a first composite face sheet, and wherein the method further comprises bonding the composite tubular structures to the first composite face sheet.

8. The method of claim 7, wherein the composite tubular structures are arranged between the first composite face sheet and a second composite face sheet, and wherein the method further comprises bonding the composite tubular structures to the second composite face sheet.

9. The method of claim 8, wherein bonding the composite tubular structures to each other, to the first composite face sheet, and to the second composite face sheet comprises co-curing the composite tubular structures, the first composite face sheet, and the second composite face sheet.

10. The method of claim 1, wherein the support structure is non-planar.

11. The method of claim 1, wherein bonding the composite tubular structures to each other is performed using an in-situ adhesive of the composite tubular structures.

12. The method of claim 1, wherein bonding the composite tubular structures comprises residual curing the composite tubular structures.

13. The method of claim 1, wherein the mandrel has a length and a cross-section, perpendicular to the length, and wherein the cross-section differs along the length.

14. The method of claim 1, wherein at least two of the composite tubular structures have different lengths.

15. The method of claim 1, wherein the composite tubular structures are arranged and bonded together to form an interconnected grid.

16. The method of claim 15, wherein each of the composite tubular structures comprises a first end and a second end, opposite of the first end, such that the first end of each of the composite tubular structures forms a part of a first grid surface of the interconnected grid, while the second end each of the composite tubular structures forms a part of a second grid surface of the interconnected grid.

17. The method of claim 15, wherein each of the composite tubular structures comprises a composite wall, extending between the first end and the second end and forming a perimetrically enclosed space.

18. The method of claim 17, wherein a first composite face sheet is disposed over and directly contacting each of composite tubular structures at the first end, such that the first composite face sheet seals the perimetrically enclosed space of each of the composite tubular structures at the first end.

19. The method of claim 1, wherein at least one of the composite tubular structures, cut from the composite tube, have tapered walls.

20. The method of claim 1, further comprising removing the mandrel from the composite tube.

* * * * *